(12) United States Patent
DesJardien et al.

(10) Patent No.: US 10,017,277 B2
(45) Date of Patent: Jul. 10, 2018

(54) APPARATUS, SYSTEM, AND METHOD FOR SUPPORTING A WING ASSEMBLY

(71) Applicant: The Boeing Company, Chicago, IL (US)

(72) Inventors: Matthew Ray DesJardien, Kenmore, WA (US); Eric M. Reid, Kenmore, WA (US); Steven A. Best, Marysville, WA (US); Jaeeun Shin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 439 days.

(21) Appl. No.: 14/558,834

(22) Filed: Dec. 3, 2014

(65) Prior Publication Data

US 2015/0314892 A1    Nov. 5, 2015

Related U.S. Application Data

(60) Provisional application No. 61/986,773, filed on Apr. 30, 2014.

(51) Int. Cl.
*B64F 5/50*    (2017.01)
*B64F 5/10*    (2017.01)

(52) U.S. Cl.
CPC .................. *B64F 5/50* (2017.01); *B64F 5/10* (2017.01); *Y10T 29/50* (2015.01)

(58) Field of Classification Search
CPC ....................................................... B64F 5/50
USPC ........... 29/822, 823, 824, 559, 281.1, 281.4, 29/281.6, 283, 783, 784, 794
See application file for complete search history.

(56) References Cited

U.S. PATENT DOCUMENTS

| | | |
|---|---|---|
| 4,006,650 A | 2/1977 | Elmer |
| 4,108,566 A | 8/1978 | Jones |
| 4,148,401 A | 4/1979 | Kautetzky |
| 4,445,588 A | 5/1984 | Truninger |
| 4,477,216 A | 10/1984 | Van De Motter et al. |
| 4,483,080 A | 11/1984 | Knoll |
| 4,599,018 A | 7/1986 | Woods |
| 4,674,949 A | 6/1987 | Kroczynski |

(Continued)

FOREIGN PATENT DOCUMENTS

| | | |
|---|---|---|
| CA | 2497249 A1 | 8/2006 |
| CA | 2553747 C | 7/2013 |

(Continued)

OTHER PUBLICATIONS

Extended European Search Report, dated Sep. 22, 2015, regarding Application No. EP14196571.5, 8 pages.

(Continued)

*Primary Examiner* — Jason L Vaughan
*Assistant Examiner* — Amanda Meneghini
(74) *Attorney, Agent, or Firm* — Yee & Associates, P.C.

(57) ABSTRACT

A method and apparatus for supporting a structure. The apparatus may comprise a support, a load-balancing structure associated with the support, and a set of connection devices associated with the load-balancing structure. The set of connection devices may be configured to connect to the structure to form a set of control points. Each of the set of connection devices may be configured to independently control a location of a corresponding control point in the set of control points.

15 Claims, 14 Drawing Sheets

(56) References Cited

U.S. PATENT DOCUMENTS

| | | | |
|---|---|---|---|
| 4,710,086 A | 12/1987 | Naaktgeboren et al. | |
| 4,781,517 A | 11/1988 | Pearce et al. | |
| 4,850,763 A | 7/1989 | Jack et al. | |
| 4,885,836 A | 12/1989 | Bonomi et al. | |
| 4,940,382 A | 7/1990 | Castelain et al. | |
| 4,995,146 A * | 2/1991 | Woods | B25B 5/003 269/45 |
| 5,022,542 A | 6/1991 | Beier | |
| 5,150,506 A | 9/1992 | Kotake et al. | |
| 5,203,855 A | 4/1993 | Givler et al. | |
| 5,210,935 A | 5/1993 | Givler | |
| 5,213,454 A | 5/1993 | Givler et al. | |
| 5,216,819 A | 6/1993 | Givler | |
| 5,231,747 A | 8/1993 | Clark et al. | |
| 5,231,754 A | 8/1993 | Givler | |
| 5,259,104 A | 11/1993 | Givler | |
| 5,263,236 A | 11/1993 | Givler | |
| 5,326,201 A | 7/1994 | King | |
| 5,351,626 A | 10/1994 | Yanagisawa | |
| 5,390,128 A | 2/1995 | Ryan et al. | |
| 5,407,415 A | 4/1995 | Spishak | |
| 5,419,268 A | 5/1995 | Fyler et al. | |
| 5,468,099 A | 11/1995 | Wheetley et al. | |
| 5,524,180 A | 6/1996 | Wang et al. | |
| 5,526,203 A | 6/1996 | Mohajerani et al. | |
| 5,564,655 A | 10/1996 | Garland et al. | |
| 5,646,870 A | 7/1997 | Krivokapic et al. | |
| 5,653,351 A | 8/1997 | Grout et al. | |
| 5,657,429 A | 8/1997 | Wang et al. | |
| 5,709,026 A | 1/1998 | Veselaski et al. | |
| 5,715,729 A | 2/1998 | Toyama et al. | |
| 5,761,064 A | 6/1998 | La et al. | |
| 5,822,877 A | 10/1998 | Dai | |
| 5,848,859 A | 12/1998 | Clark et al. | |
| 5,910,894 A | 6/1999 | Pryor | |
| 5,920,394 A | 7/1999 | Gelbart et al. | |
| 6,098,260 A | 8/2000 | Sarh | |
| 6,210,084 B1 | 4/2001 | Banks et al. | |
| 6,230,382 B1 | 5/2001 | Cunningham et al. | |
| 6,779,272 B2 | 8/2004 | Day et al. | |
| 6,843,328 B2 | 1/2005 | Boyl-Davis et al. | |
| 6,862,912 B2 | 3/2005 | Olsson | |
| 6,871,524 B2 | 3/2005 | Olsson | |
| 6,926,094 B2 | 8/2005 | Arntson et al. | |
| 6,961,626 B1 | 11/2005 | Paik | |
| 7,168,898 B2 | 1/2007 | Hamann | |
| 7,249,943 B2 | 7/2007 | Benson et al. | |
| 7,273,333 B2 | 9/2007 | Buttrick et al. | |
| 7,406,758 B2 | 8/2008 | Jones et al. | |
| 7,614,154 B2 | 11/2009 | Cobb | |
| 8,005,563 B2 | 8/2011 | Cobb et al. | |
| 8,299,118 B2 | 10/2012 | Chang et al. | |
| 8,539,658 B2 | 9/2013 | Munk | |
| 8,606,388 B2 | 12/2013 | Cobb et al. | |
| 8,620,470 B2 | 12/2013 | Cobb et al. | |
| 8,661,684 B1 * | 3/2014 | Boyd | B21D 53/92 29/407.1 |
| 8,763,953 B2 | 7/2014 | Sakurai et al. | |
| 8,790,050 B2 | 7/2014 | Marguet et al. | |
| 9,090,357 B2 | 7/2015 | Oberoi et al. | |
| 9,205,933 B2 | 12/2015 | Oberoi et al. | |
| 9,299,118 B1 | 3/2016 | McGraw | |
| 2002/0066192 A1 | 6/2002 | Cunningham et al. | |
| 2002/0136612 A1 | 9/2002 | Martinez et al. | |
| 2003/0043964 A1 | 3/2003 | Sorenson | |
| 2003/0097198 A1 | 5/2003 | Sonderman et al. | |
| 2003/0149502 A1 | 8/2003 | Rebello et al. | |
| 2004/0039465 A1 | 2/2004 | Boyer et al. | |
| 2005/0036879 A1 | 2/2005 | Jhaveri et al. | |
| 2005/0049126 A1 | 3/2005 | Everson et al. | |
| 2005/0172470 A1 | 8/2005 | Cobb et al. | |
| 2005/0223549 A1 | 10/2005 | Braun | |
| 2006/0108470 A1 | 5/2006 | McCrary et al. | |
| 2007/0029877 A1 | 2/2007 | Longley | |
| 2007/0180674 A1 | 8/2007 | Morden et al. | |
| 2008/0077276 A1 | 3/2008 | Montero Sanjuan et al. | |
| 2008/0155807 A1 | 7/2008 | Toh et al. | |
| 2008/0205763 A1 | 8/2008 | Marsh et al. | |
| 2009/0112349 A1 | 4/2009 | Cobb et al. | |
| 2009/0297316 A1 | 12/2009 | Wells et al. | |
| 2010/0025349 A1 | 2/2010 | Khoshnevis | |
| 2010/0151364 A1 | 6/2010 | Ye et al. | |
| 2010/0180711 A1 | 7/2010 | Kilibarda et al. | |
| 2010/0204817 A1 | 8/2010 | Fujita | |
| 2010/0217437 A1 | 8/2010 | Sarh et al. | |
| 2011/0010007 A1 | 1/2011 | Sarh et al. | |
| 2011/0054694 A1 | 3/2011 | Munk | |
| 2011/0132548 A1 | 6/2011 | De Mattia | |
| 2011/0178727 A1 | 7/2011 | Hafenrichter et al. | |
| 2011/0214586 A1 | 9/2011 | Wessel et al. | |
| 2012/0014759 A1 | 1/2012 | Sarh et al. | |
| 2012/0210802 A1 | 8/2012 | Sarh et al. | |
| 2013/0014368 A1 | 1/2013 | Woods et al. | |
| 2013/0018525 A1 | 1/2013 | Jang et al. | |
| 2013/0145850 A1 | 6/2013 | Lute, Jr. et al. | |
| 2013/0152397 A1 | 6/2013 | Oberoi et al. | |
| 2013/0158697 A1 | 6/2013 | Stone et al. | |
| 2013/0226340 A1 | 8/2013 | Buchstab | |
| 2013/0289766 A1 | 10/2013 | Hafenrichter et al. | |
| 2014/0115860 A1 | 5/2014 | Sarh et al. | |
| 2014/0157588 A1 | 6/2014 | Boyd et al. | |
| 2014/0277717 A1 | 9/2014 | Jung et al. | |
| 2014/0305217 A1 | 10/2014 | Tapia et al. | |
| 2014/0340509 A1 | 11/2014 | Fairbairn | |
| 2015/0023748 A1 | 1/2015 | Carberry et al. | |
| 2015/0135535 A1 | 5/2015 | Hallam et al. | |
| 2015/0266147 A1 | 9/2015 | Reid et al. | |
| 2016/0067792 A1 | 3/2016 | Cardon et al. | |
| 2016/0128656 A1 | 5/2016 | Gregerson et al. | |
| 2016/0334301 A1 | 11/2016 | Hafenrichter et al. | |
| 2017/0197253 A1 | 7/2017 | Cardon et al. | |

FOREIGN PATENT DOCUMENTS

| | | |
|---|---|---|
| DE | 102008041190 A1 | 3/2010 |
| EP | 1227316 A2 | 7/2002 |
| EP | 1884453 A2 | 2/2008 |
| EP | 2108515 A1 | 10/2009 |
| EP | 2221151 A2 | 8/2010 |
| EP | 2631041 A2 | 8/2013 |
| EP | 2792431 A1 | 10/2014 |
| GB | 2095215 A | 9/1982 |
| GB | 2329138 A | 3/1993 |
| GB | 2473100 A | 3/2011 |
| GB | 2498977 A | 8/2013 |
| WO | WO2010018340 A2 | 2/2010 |
| WO | WO2014193602 A2 | 12/2014 |

OTHER PUBLICATIONS

Partial European Search Report, dated Sep. 30, 2015, regarding Application No. EP14196480.9, 6 pages.

Extended European Search Report, dated Oct. 2, 2015, regarding Application No. EP14196553.3, 7 pages.

Extended European Search Report, dated Jan. 27, 2016, regarding Application No. EP14196480.9, 10 pages.

Office Action, dated Mar. 4, 2016, regarding U.S. Appl. No. 14/558,850, 24 pages.

Extended European Search Report, dated Apr. 8, 2016, regarding Application No. EP14196494.0, 6 pages.

Extended European Search Report, dated May 2, 2016, regarding Application No. EP14196483.3, 7 pages.

Extended European Search Report, dated May 2, 2016, regarding Application No. EP14196468.4, 7 pages.

Extended European Search Report, dated May 3, 2016, regarding Application No. EP14196548.3, 7 pages.

Office Action, dated May 12, 2016, regarding U.S. Appl. No. 14/558,899, 35 pages.

Office Action, dated May 12, 2016, regarding U.S. Appl. No. 14/558,859, 27 pages.

Final Office Action, dated Aug. 2, 2016, regarding U.S. Appl. No. 14/558,850, 33 pages.

(56) References Cited

OTHER PUBLICATIONS

Notice of Allowance, dated Jul. 7, 2016, regarding U.S. Appl. No. 14/558,859, 29 pages.
Canadian Intellectual Property Office Search Report, dated Feb. 24, 2017, regarding Application No. 2,883,614, 17 pages.
Canadian Intellectual Property Office Search Report, dated Feb. 23, 2017, regarding Application No. 2,896,059, 11 pages.
Canadian Intellectual Property Office Office Action, dated Mar. 1, 2017, regarding Application No. 2,882,420, 7 pages.
Canadian Intellectual Property Office Office Action, dated Mar. 31, 2017, regarding Application No. 2,882,466, 20 pages.
Canadian Intellectual Property Office Office Action, dated Mar. 30, 2017, regarding Application No. 2,882,4485, 17 pages.
Notice of Allowance, dated Apr. 24, 2017, regarding U.S. Appl. No. 14/558,850, 11 pages.
Notice of Allowance, dated Feb. 27, 2017, regarding U.S. Appl. No. 14/558,899, 13 pages.
Office Action, dated May 3, 2017, regarding U.S. Appl. No. 14/559,034, 55 pages.
Spishak et al., "Magnet Sensing Hole Driller and Method Therefor," U.S. Appl. No. 13/931,165, filed Jun. 28, 2013, 33 pages.
Larson et al., "Modular Stanchion System," U.S. Appl. No. 13/926,646, filed Jun. 25, 2013, 31 pages.
Desjardien et al., "Modular and Reconfigurable Support System," U.S. Appl. No. 13/904,789, filed May 29, 2013, 73 pages.
Best et al., "Apparatus and Method for Moving a Structure in a Manufacturing Environment," U.S. Appl. No. 13/940,843, filed Jul. 12, 2013, 45 pages.
Valenzuela et al., "Systems and Methods for Movement of Objects," U.S. Appl. No. 14/189,828, filed Feb. 25, 2014, 41 pages.
Larson et al., "Modular Stanchion System," U.S. Appl. No. 14/265,946, filed Apr. 30, 2014, 34 pages.
Cobb et al., "Metrology System for Positioning Assemblies," U.S. Appl. No. 14/559,034, filed Dec. 3, 2014, 84 pages.
Day et al., "Crawler Robot and Supporting Platform," U.S. Appl. No. 14/558,850, filed Dec. 3, 2014, 78 pages.
Reid et al., "System and Method for Positioning an Automated Assembly Tool Relative to a Structure," U.S. Appl. No. 14/558,853, filed Dec. 3, 2014, 128 pages.
Reid et al., "Mobile Automated Assembly Tool for Aircraft Structures," U.S. Appl. No. 14/558,859, filed Dec. 3, 2014, 76 pages.
Day et al., "Flexible Manufacturing System for Aircraft Structures," U.S. Appl. No. 14/558,867, filed Dec. 3, 2014, 153 pages.
Desjardien et al., "Mobile Automated Overhead Assembly Tool for Aircraft Structures," U.S. Appl. No. 14/558,899, filed Dec. 3, 2014, 100 pages.
Office Action, dated Nov. 10, 2016, regarding U.S. Appl. No. 14/558,850, 23 pages.
Final Office Action, dated Nov. 17, 2016, regarding U.S. Appl. No. 14/558,899, 36 pages.
Canadian Intellectual Property Office Office Action, dated Apr. 25, 2017, regarding Application No. 2,886,500, 19 pages.
Final Office Action, dated Oct. 2, 2017, regarding U.S. Appl. No. 14/559,034, 21 pages.
Office Action, dated Nov. 29, 2017, regarding U.S. Appl. No. 14/558,853, 78 pages.
Canadian Intellectual Propoerty Office Examination Report, dated Dec. 14, 2017, regarding Application No. 2,882,446, 16 pages.
Notice of Allowance, dated Jan. 17, 2018, regarding U.S. Appl. No. 14/559,034, 13 pages.
Canadian Intellectual Property Office Office Action, dated Feb. 15, 2018, regarding Application No. 2,883,614, 20 pages.

\* cited by examiner

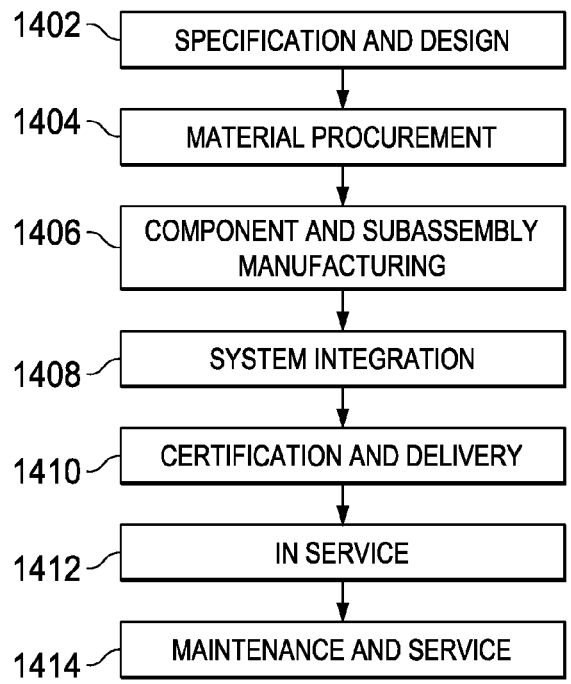
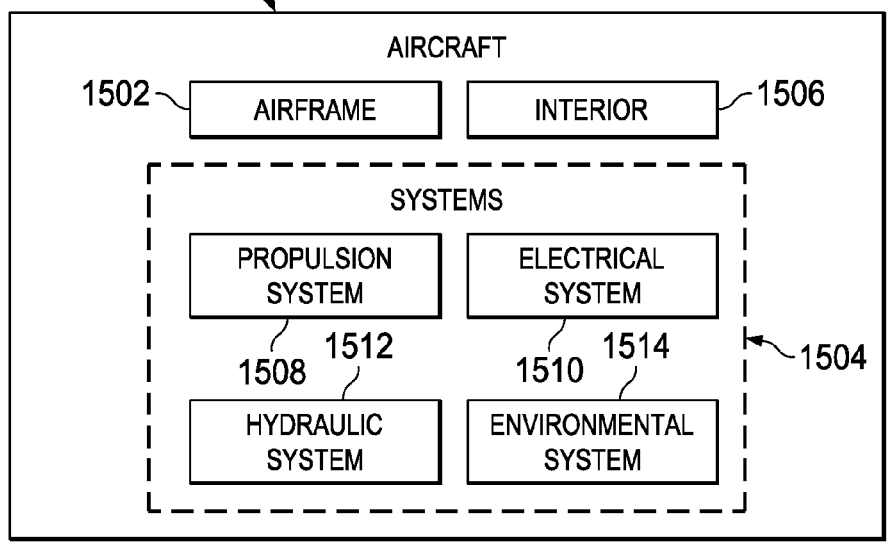

APPARATUS, SYSTEM, AND METHOD FOR SUPPORTING A WING ASSEMBLY

RELATED PROVISIONAL APPLICATION

This application claims the benefit of U.S. Provisional Patent Application Ser. No. 61/986,773, filed Apr. 30, 2014, and entitled "Apparatus, System, and Method for Supporting a Wing Assembly."

CROSS-REFERENCE TO RELATED APPLICATIONS

This application is related to the following patent applications: entitled "Mobile Automated Overhead Assembly Tool for Aircraft Structures," Ser. No. 14/558,899; entitled "Mobile Automated Assembly Tool for Aircraft Structures," Ser. No. 14/558,859; entitled "Crawler Robot and Supporting Platform," application Ser. No. 14/558,850, issued as U.S. Pat. No. 9,776,330 on Oct. 3, 2017; entitled "Flexible Manufacturing System for Aircraft Structures," application Ser. No. 14/558,867; entitled "System and Method for Positioning an Automated Assembly Tool Relative to a Structure," application Ser. No. 14/558,853; and entitled "Metrology System for Positioning Assemblies," application Ser. No. 14/559,034, Notice of Allowance mailed Mar. 13, 2018, all filed of even date herewith, each assigned to the same assignee, and each incorporated herein by reference in its entirety.

BACKGROUND INFORMATION

1. Field

The present disclosure relates generally to the manufacturing of structures and, in particular, to the manufacturing of aircraft structures. Still more particularly, the present disclosure relates to a method and apparatus for maintaining a selected configuration of a structure during the manufacturing of a completed aircraft structure using the structure.

2. Background

As one example, the front spar assembly and the rear spar assembly for a wing may need to be held in certain positions relative to each other, while various operations are performed to assemble the wing. These operations may be performed simultaneously, at different times, or both. The operations performed may include, for example, without limitation, any combination of drilling, countersinking, fastening, coupling, sealing, coating, inspecting, painting, welding, machining, bonding, additive manufacturing processes, or other suitable types of operations.

Some currently available methods for assembling an aircraft structure use rigid fixtures to hold components in certain positions during the assembly process. In some cases, these rigid fixtures may be fastened to the factory floor to form an assembly line for manufacturing the aircraft structure. However, these fixtures may limit future expansion of the assembly line because the fixtures are typically permanently fastened to the factory floor. For example, these rigid fixtures may take the form of fixed monuments that are bolted to the factory floor or secured to the factory floor in some other manner.

Further, these fixtures may be unable to accommodate the manufacturing of aircraft structures of different shapes and sizes. Once installed, the rigid fixtures may not allow the flexibility needed to account for aircraft design changes, changes in manufacturing locations, changes in aircraft production rate, or other types of changes. Consequently, using these types of rigid fixtures for the assembly of aircraft structures may cause the assembly process to be more time-consuming and expensive than desired. Additionally, the rigid fixtures may require more maintenance than desired over time.

For example, one manner in which an aircraft structure, such as a wing, may be currently held in a horizontal position may involve the use of fixed supports such as a fixed jig. This type of assembly of a wing may be referred to as a horizontal build. A fixed jig may be a structure or device that may be used to hold the parts for a wing.

The fixed jig may be attached to the floor of the manufacturing environment and may not move or be moved from one floor location to another floor location. In other words, the fixed jig may be immobile. The fixed jig may have tools that may be attached to the parts for the wing at control points. These tools may hold the parts at the control points to restrain assembly dimensional shape within tolerances and the parts in the desired position for assembly of the wing. Control points may be attachment points on the structure such as leading or trailing edge attachment points or control surface hinge points for structures such as slats, spoilers, rudders, flaps, control surfaces, or other points where something can be attached to the structure during the build process.

The tools in the fixed jig may have a feedback loop, may have support to the floor, and may be calibrated with respect to global positions. These types of fixed jigs may be expensive, immobile, inflexible, and may cause bottlenecks in manufacturing. A system of discrete pogos may be used to hold parts for assembly into a wing. As the number of control points increases, this type of system may become cluttered and advantages of this type of system may be reduced. Further, pogos may be numerically controlled and may require considerable capital investment.

With the currently used systems for holding parts for the assembly into wings, a large number of control points are used to ensure that the wing may be assembled with a correct orientation, location, and acceptable deflection. Managing these control points with a horizontal build for a wing may result in less than desirable manufacturing conditions. For example, with the large number of control points, access to the spars, wing edge, and the bottom side of the assembly for the wing may be more difficult than desired. Therefore, it would be desirable to have a method and apparatus that take into account at least some of the issues discussed above, as well as other possible issues.

SUMMARY

In one illustrative embodiment, an apparatus may comprise a support, a load-balancing structure associated with the support, and a set of connection devices associated with the load-balancing structure. The set of connection devices may be configured to connect to a structure to form a set of control points. Each of the set of connection devices may be configured to independently control a location of a corresponding control point in the set of control points.

In another illustrative embodiment, an apparatus may comprise a first support, a second support, a load-balancing structure associated with the first support and the second support, and a set of connection devices associated with the load-balancing structure. The set of connection devices may be configured to connect to a structure to form a set of control points. Each of the set of connection devices may be configured to independently control a location of a corresponding control point in the set of control points.

In yet another illustrative embodiment, an apparatus may comprise a number of supports, a load-balancing structure associated with the number of supports, and a set of connection devices associated with the load-balancing structure. The number of supports may be configured to be roughly positioned relative to a structure. The set of connection devices may be configured to precisely connect to the structure at a set of control points.

In still yet another illustrative embodiment, a method for supporting a structure may be provided. A number of supports may be moved relative to a work surface to position the number of supports relative to the structure using a first movement system. A load-balancing structure associated with the number of supports may be moved to position the load-balancing structure relative to the structure using a second movement system. An element associated with the load-balancing structure may be moved to position the element relative to a location on the structure using a third movement system.

In yet another illustrative embodiment, a method for supporting a structure may be provided. A support may be moved onto a work surface to roughly position the support relative to the structure using a first movement system. A load-balancing structure associated with the support may be moved to finely position a connection device associated with the load-balancing structure relative to the support using a second movement system. An element of the connection device may be moved relative to the load-balancing structure to precisely position the element at a location on the structure using a third movement system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of an aircraft manufacturing and service method in the form of a block diagram in accordance with an illustrative embodiment; and FIG. 15 is an illustration of an aircraft in the form of a block diagram in which an illustrative embodiment may be implemented.

DETAILED DESCRIPTION

Figure 1:
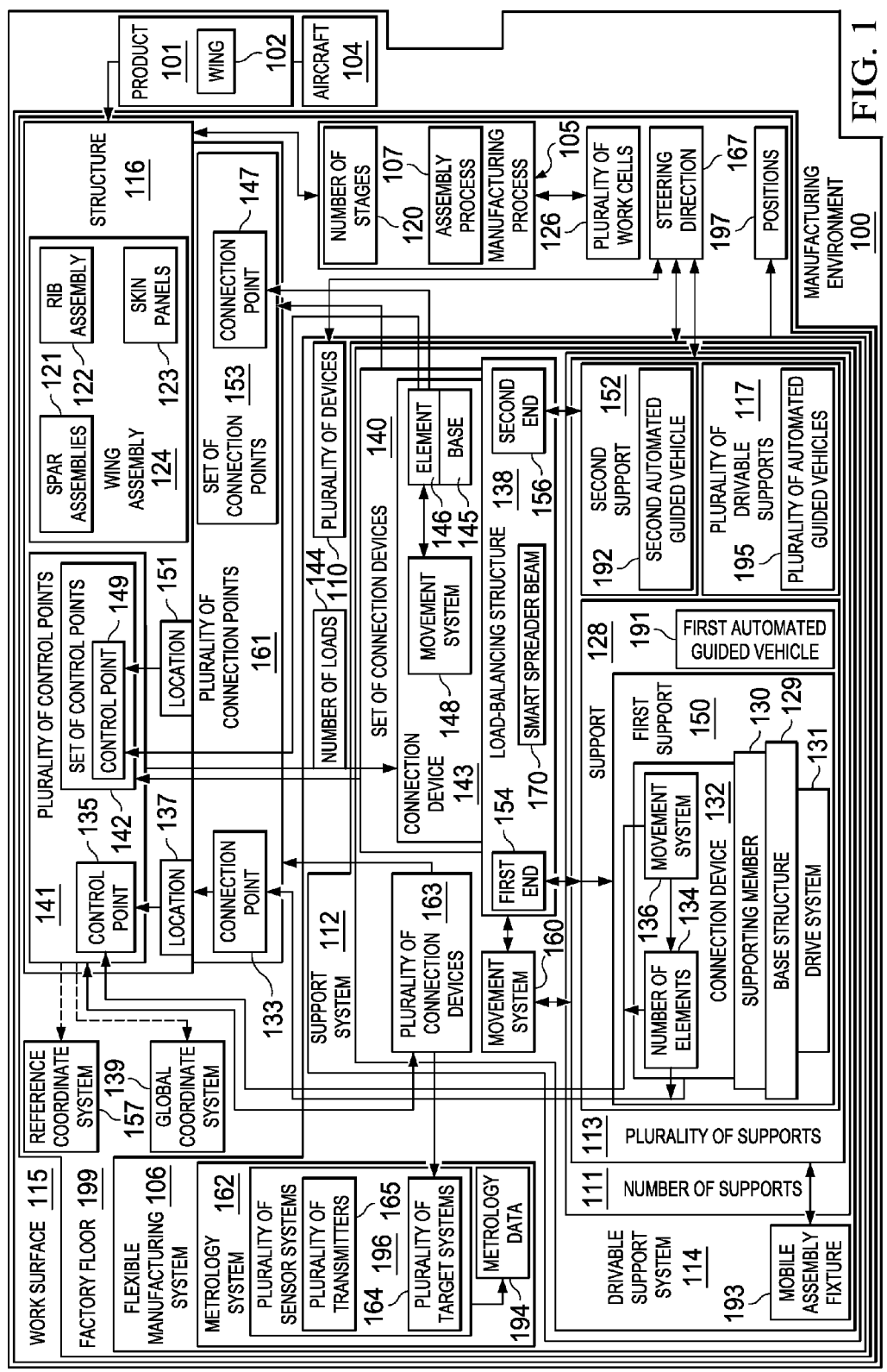
FIG. 1 is an illustration of a manufacturing environment in the form of a block diagram in accordance with an illustrative embodiment.

The illustrative embodiments recognize and take into account different considerations. For example, the illustrative embodiments recognize and take into account that it may be desirable to use a mobile and reconfigurable support system for holding components used in the assembly of aircraft structures. This mobile and reconfigurable support system may include any number of automated guided vehicles (AGVs). In particular, a support system that can be moved into a manufacturing environment, such as a factory area, and out of the manufacturing environment as needed to assemble one or more different types of aircraft structures may be desirable. More often than not, the mobile and reconfigurable support system will probably be moved or driven across the shop floor from one location to another within the manufacturing environment.

Additionally, the illustrative embodiments recognize and take into account that it may be desirable to have a support system that can be moved between different work cells or work areas within a manufacturing environment, each designated for a different stage of the manufacturing process. The illustrative embodiments also recognize and take into account that when automated guided vehicles are used, it may be desirable to have the automated guided vehicles congregate in a selected formation. This selected formation may form a mobile fixture that holds the assembly of parts for the wing during the build process.

The illustrative embodiments recognize and take into account that it may be desirable to move these automated guided vehicles in the mobile fixture in a coordinated manner from location to location for different work areas, cells, or other locations until a point of assembly is reached such that the assembly may be removed from the mobile fixture created by the formation for the automated guided vehicles. The illustrative embodiments recognize and take into account that it may be desirable to move the automated guided vehicles back to another location for formation of another mobile fixture, storage, or both.

In this manner, the structure being supported by the support system may be more easily and more quickly moved between work cells. The illustrative embodiments recognize and take into account that a mobile and reconfigurable support system may provide flexibility to the overall manufacturing process and may reduce the overall time, expense, and effort needed to manufacture a product, such as an aircraft structure.

Further, the illustrative embodiments recognize and take into account that it may be desirable to use supports that are independently mobile relative to each other such that the supports can move along a factory floor to form some desired formation or arrangement relative to the factory floor. In this manner, different numbers of supports may be used to support components with different sizes, different shapes, or both.

The illustrative embodiments recognize and take into account that the formation or arrangement of the automated guided vehicles may form one or more mobile fixtures to transport the assembly during the build process from one location to another location relative to the shop floor. Further, the illustrative embodiments also recognize and take into account that the assembly of parts may occur during movement of the mobile fixture from one location to another location.

The illustrative embodiments also recognize and take into account that in the past, dimensional control of the assembly was heavily dependent on fixturing. This dependency required the fixtures to be heavy, inflexible, and bolted to a shop floor. The illustrative embodiments recognize and take into account that the trend is towards more and more dimensional control of the assembly based upon the assembly components and build processes and less and less on hard, large, rigid, and attached fixtures. The illustrative embodiments recognize and take into account that with this trend, orientation and dimensional control of the structure being assembled are controlled by a relatively large number of points to be controlled by fixturing during assembly. As the number of holding points increases, the potential for dimensional control of the structure during assembly also increases. The automated guided vehicles (AGV) would be employed to hold the structure at the large number of points to be controlled by fixturing during the assembly.

However, the illustrative embodiments also recognize and take into account that a large number of holding points would also require a large number of automated guided vehicles when a ratio of one automated guided vehicle to one control point is used. The large number of automated guided vehicles, due to the one to one ratio, would densely fill the portion of the shop floor under the structure during assembly. Access to the area under the structure and around the automated guided vehicles for assembly operations on the leading and trailing edges, tips, and upper and lower surfaces may be more difficult than desired. This difficulty may increase the time, expense, or both with respect to the assembly of a structure.

Thus, the illustrative embodiments recognize and take into account that avoiding the ratio of one automated guided vehicle to one control point may be desirable. When the number of control points present per automated guided vehicle increases, access and egress for assembly operations may be improved. For example, the illustrative embodiments recognize and take into account that the ratio of control points to automated guided vehicles may be increased to a ratio of 3:2, 4:2, 5:2, 3:1, 4:1, 2:1, 6:2, 8:2, or some other ratio other than 1:1. Thus, fewer automated guided vehicles may be needed at lighter areas of the assembly. For example, fewer automated guided vehicles may be needed at the tip portion of a wing assembly.

Additionally, the illustrative embodiments recognize and take into account that it may be desirable to have a support system that includes a movable platform onto which fixtures may be removably fastened. In this manner, the support system may allow an assembly line to be expanded or reduced in size as needed. Further, this type of support system may provide the flexibility needed to account for aircraft design changes, changes in manufacturing locations, changes in aircraft production rate, or other types of changes.

However, the illustrative embodiments also recognize and take into account that moving the support system may cause the positions of components being held by the support system to deviate from desired positions for these components. In some cases, the performance of certain operations during the manufacturing process may cause undesired movement of the components supported by the support system.

Thus, the illustrative embodiments recognize and take into account that it may be desirable to have an automatic selection of connection points and monitoring of the connection point during assembly. Thus, the illustrative embodiments may include or imbed computer numerical control (CNC) into the automated guided vehicles.

As one example, a support system may be used to hold a wing assembly for forming a wing for an aircraft in a selected configuration during manufacturing of the wing in a factory. The illustrative embodiments recognize and take into account that it may be desirable to have a support system capable of maintaining a selected configuration of the wing assembly during manufacturing to account for any deviations from the selected configuration during movement of the support system between work cells and deviations from the selected configuration based on increased or decreased gravitational forces and loads applied to the wing assembly during manufacturing.

Thus, the illustrative embodiments recognize and take into account that it may be desirable to have a support system capable of roughly, finely, and precisely positioning control points on a structure. For example, the support system may leverage the higher load capacity of the automated guided vehicles. A bridge may be made between two automated guided vehicles to support a multitude of points on a single smart spreader beam. This type of support may work especially well at the tip of the wing, where the loads are light, and the control points are dense. In this manner, access for work and egress may be improved.

Further, a metrology system may be used to ensure that the various control points provided by the automated guided vehicles and the smart spreader beam may be used to provide feedback control of each of the control points. In particular, each point on the wing assembly supported by the smart spreader beam and the automated guided vehicles may be monitored using the metrology system. The automated guided vehicles and the connection devices on the smart spreader beam may be operated to ensure that the points being supported are in desired locations.

In this manner, the spreader beams and automated guided vehicles may provide an automated connection point location and monitoring of the connection points during assembly. Further, the metrology system may provide critical data feedback to ensure desired accuracy of the automated connection point location.

In one illustrative example, processes used for computer numerical control may be included in the automated guided vehicle. The illustrative example provides the flexibility to globally locate a part and use a fine positioning system at the control point. In this manner, one or more illustrative embodiments may leverage the capabilities of automated guided vehicles and provide additional control through computer numerical control processes. With these and other features in the illustrative embodiments described below, the number, size, and weight of automated guided vehicles or some combination thereof may be reduced.

For example, a load balancing structure may be used that connects to two automated guided vehicles in a manner that may be lighter and require less stiffness than when only a single automated guided vehicle is employed. In this manner, access to an assembly, movement of tools, people, and equipment to various locations may occur more easily.

Referring now to the figures and, in particular, with reference to FIG. 1, an illustration of a manufacturing environment is depicted in the form of a block diagram in accordance with an illustrative embodiment. In this illustrative example, manufacturing environment 100 may be an example of an environment in which product 101 may be manufactured. Product 101 may be a physical product that is comprised of any number of parts, components, sub-assemblies, assemblies, or systems.

In one illustrative example, product 101 may take the form of wing 102 for aircraft 104. Wing 102 assembled may be an example of one implementation for product 101. In other illustrative examples, product 101 may take some other form such as, for example, without limitation, a fuselage for aircraft 104, a control surface for aircraft 104, an engine system for aircraft 104, aircraft 104 itself, the hull of a ship, a satellite, a housing, a frame, a container, or some other type of product.

The manufacturing of product 101 may be performed in a number of different ways. The manufacturing of product 101 may include performing any number of operations. For example, manufacturing process 105 may be used to manufacture product 101. Manufacturing process 105 may include any number and any combination of drilling, countersinking, fastening, coupling, sealing, coating, inspecting, painting, welding, machining, bonding, additive manufacturing processes, and other suitable types of operations.

In one illustrative example, the manufacturing system used to perform manufacturing process 105 may take the form of flexible manufacturing system 106. Flexible manufacturing system 106 may be a manufacturing system having the flexibility to change to produce new product types, the ability to change the order of operations executed on a part for product 101, the ability to use multiple devices to perform the same operation on a part, the ability to handle large-scale changes in volume, capacity, or capability, or some combination thereof.

In this illustrative example, flexible manufacturing system 106 may be a manufacturing system that is at least partially automated. In one illustrative example, flexible manufacturing system 106 is a substantially fully automated system for manufacturing product 101 on work surface 115. In this example, flexible manufacturing system 106 may be referred to as an autonomous flexible manufacturing system.

In some illustrative examples, manufacturing process 105 may take the form of assembly process 107. Assembly process 107 may be used to assemble the various parts, sub-assemblies, and assemblies needed to form product 101. When manufacturing process 105 takes the form of assembly process 107, flexible manufacturing system 106 may take the form of a flexible assembly system.

Flexible manufacturing system 106 may be movable and reconfigurable in this illustrative example. In particular, flexible manufacturing system 106 may include plurality of devices 110, each of which may be movable to various positions 197 relative to work surface 115. Each of positions 197 may be comprised of a location, an orientation, or both relative to work surface 115. The location may be with respect to a two-dimensional coordinate system or a three-dimensional coordinate system.

As used herein, a device that is "movable" may mean that the item can move or be moved. In some cases, a movable device may take the form of a mobile device. A device that is "mobile" may be able to move from one location in three-dimensional space to another location in three-dimensional space. In particular, an entirety of the device, which may include all of the components that make up the device, may be capable of moving or being moved from one location in three-dimensional space to another location in three-dimensional space. In this manner, the device is not fixed to a particular location. In some cases, a mobile device may take the form of a drivable device.

A device that is "drivable" may be able to move from one location in three-dimensional space to another location in three-dimensional space as described above. Movement of a drivable device may be controlled using, for example, without limitation, a controller for the device, a system controller for flexible manufacturing system 106, or some other type of controller. Depending on the implementation, movement of a drivable device may be controlled at least one of electronically, mechanically, electromechanically, or manually. In this manner, a drivable device may be capable of moving or being moved in its entirety in a number of different ways. In some cases, movement of a drivable device may be both electronically and manually controlled. For example, the device may be drivable across work surface 115 and may move from one location to another location on work surface 115.

Work surface 115 may take the form of a surface of a platform, a ground, a floor of manufacturing environment 100, a shop floor, or some other type of work surface. As one illustrative example, work surface 115 may take the form of a floor, such as factory floor 199. In another illustrative example, work surface 115 may take the form of separate flooring that has been laid over factory floor 199. This separate flooring may be used to create a substantially smooth and substantially level surface over which plurality of devices 110 may easily move.

As depicted, a portion of plurality of devices 110 may form support system 112. For example, plurality of devices 110 may include number of supports 111 that form support system 112. Depending on the implementation, number of supports 111 may include one or more supports. Support 128 may be an example of one of number of supports 111. When number of supports 111 includes more than one support, number of supports 111 may take the form of plurality of supports 113 that form support system 112.

Support system 112 may be flexible, movable, and reconfigurable. For example, support system 112 may take the form of drivable support system 114 in this illustrative example. Drivable support system 114 may be a movable support system that may move across factory floor 199 in some cases. In particular, plurality of supports 113 that form drivable support system 114 may be driven into various positions 197. In this manner, plurality of supports 113 may be referred to as plurality of drivable supports 117.

In one illustrative example, plurality of drivable supports 117 may take the form of plurality of automated guided vehicles 195. In these illustrative examples, plurality of automated guided vehicles 195 may be driven and arranged to form mobile assembly fixture 193 for use in performing manufacturing process 105.

The formation of mobile assembly fixture 193 using any number of automated guided vehicles in plurality of automated guided vehicles 195 may occur during movement of structure 116 on factory floor 199 in the illustrative examples. Additional ones of plurality of automated guided vehicles 195 may be added to mobile assembly fixture 193 during movement of structure 116, assembly of structure 116, or both. In this manner, mobile assembly fixture 193 may be reconfigurable before, during, and after manufacturing process 105.

Drivable support system 114 may be configured to move relative to work surface 115. For example, without limitation, drivable support system 114 may be moved along work surface 115. Work surface 115 may be a location or surface on which operations may be performed to assemble structure 116. These operations may include drilling, inspection, fastener installation, sealing, transport, or other operations with respect to structure 116 that may be performed in manufacturing environment 100.

Drivable support system 114 may be used to support and hold structure 116 during number of stages 120 of manufacturing process 105. As used herein, a "number of" items may include one or more items. In this manner, number of stages 120 may include one or more stages. Drivable support system 114 may replace fixed fixtures or other fixed monuments that are attached to, bolted to, or otherwise connected to factory floor 199.

Structure 116 may be product 101 during any one of number of stages 120. In this manner, structure 116 may be one or more components used to form product 101, a partially completed product 101, or a fully completed product 101. In some cases, when number of stages 120 includes multiple stages, structure 116 may change from one stage in number of stages 120 to the next stage in number of stages 120 of manufacturing process 105.

For example, when product 101 to be manufactured is wing 102, spar assemblies 121, rib assembly 122, and skin panels 123 may be installed at different stages in number of stages 120 of manufacturing process 105. In some cases, structure 116 may be referred to as wing assembly 124, which includes spar assemblies 121, rib assembly 122, skin panels 123, other components, or some combination thereof, depending on the particular stage of number of stages 120.

In this illustrative example, number of stages 120 may be performed in plurality of work cells 126 within manufacturing environment 100. Plurality of work cells 126 may be one or more locations or areas within manufacturing environment 100. Each of plurality of work cells 126 may be designated for performing at least one of number of stages 120 of manufacturing process 105. In some illustrative examples, only a portion of number of stages 120 of manufacturing process 105 may be performed within manufacturing environment 100, while another portion of number of stages 120 of manufacturing process 105 may be performed within one or more other environments.

Support 128 may be a drivable support in this illustrative example. Support 128 may include base structure 129, supporting member 130, and drive system 131 in this illustrative example. Supporting member 130 and drive system 131 may be associated with base structure 129. In one illustrative example, support 128 may take the form of first automated guided vehicle 191.

As used herein, when one component is "associated" with another component, the association is a physical association in the depicted examples. For example, a first component, such as supporting member 130, may be considered to be associated with a second component, such as base structure 129, by being at least one of secured to the second component, bonded to the second component, mounted to the second component, welded to the second component, fastened to the second component, coupled to the second component, or connected to the second component in some other suitable manner. The first component also may be connected to the second component using a third component. Further, the first component may be considered to be associated with the second component by being formed as part of the second component, an extension of the second component, or both.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, connection device 132 may be associated with supporting member 130. Connection device 132 may be used to connect support 128 to structure 116. In this illustrative example, connection device 132 may include number of elements 134 that may be used to hold and support at least a portion of structure 116. Number of elements 134 may be used to connect support 128 to structure 116. Number of elements 134 may include, for example, without limitation, at least one of a fastening device, a connection plate, a bracket, a fitting, or some other type of connection element.

Base structure 129 may be movable from one location along an X-Y plane designated for work surface 115 to another location along this X-Y plane. In some illustrative examples, base structure 129 may be movable from one location in three-dimensional space to another location in three-dimensional space.

For example, base structure 129 may be moved relative to work surface 115 using drive system 131. In one illustrative example, drive system 131 may move base structure 129 in any number of directions along work surface 115. In this manner, base structure 129 may be omnidirectional relative to work surface 115.

Drive system 131 may include any number of components. For example, without limitation, drive system 131 may include at least one of a rail system, a wheel system comprising one or more wheels, a roller system comprising one or more rollers, a number of sliders, a number of air bearings, a holonomic wheel system, holonomic wheels, mecanum wheels, omni wheels, poly wheels, a number of motors, an actuator system comprising one or more actuators, a track system, or some other type of movement device or system.

Supporting member 130, connection device 132, and number of elements 134 may be associated with base structure 129 in a manner such that movement of base structure 129 moves supporting member 130, connection device 132, and number of elements 134 with base structure 129. In this manner, the entirety of support 128 that includes base structure 129, supporting member 130, connection device 132, and number of elements 134 may be moved together. In other words, support 128 may be a fully mobile support.

Connection device 132 may be used to connect to location 137 on structure 116 to form connection point 133. Connection point 133 may be, for example, without limitation, where connection device 132 contacts structure 116. In other illustrative examples, connection point 133 may be referred to as a contact point or a point of contact. Connection point 133 may provide control point 135. In one illustrative example, connection point 133 may take the form of control point 135 and thus, control point 135 may be co-located with connection point 133. In other illustrative examples, control point 135 may be offset from location 137 at which connection point 133 is formed.

Control point 135 may be controllable such that control point 135 may be brought into alignment with reference coordinate system 157 for structure 116 or for product 101 being manufactured. Reference coordinate system 157 may take the form of, for example, without limitation, a wing coordinate system, an aircraft coordinate system, or some other type of coordinate system.

For example, without limitation, reference coordinate system 157 may be based on product 101 or the object or platform for which product 101 is being manufactured. When product 101 is being assembled for, for example, without limitation, aircraft 104, reference coordinate system 157 may be an aircraft coordinate system. Control point 135 may be at a known location on structure 116 with respect to that aircraft coordinate system. Control point 135 may be used to transition between reference coordinate system 157 and global coordinate system 139 for manufacturing environment 100. Global coordinate system 139 may be identified using metrology system 162.

Location 137 of control point 135 in global coordinate system 139 may correspond with the location of control point 135 in reference coordinate system 157. In this manner, for example, without limitation, locations within reference coordinate system 157 at which particular operations are to be performed may be transformed into locations within global coordinate system 139. Further, locations within global coordinate system 139 at which particular operations are being performed may be transformed into locations within reference coordinate system 157.

For example, control point 135 may be used to transition between global coordinate system 139 for manufacturing environment 100 and reference coordinate system 157, which may be for wing 102 or for aircraft 104. In this manner, control point 135 may be used to locate structure 116 with respect to reference coordinate system 157.

Control point 135 may be controllable using movement system 136. Movement system 136 may be associated with connection device 132. In this illustrative example, movement system 136 may be considered part of connection device 132. Movement system 136 may take a number of different forms. For example, without limitation, movement system 136 may include at least one of a rail system, a wheel system comprising one or more wheels, a roller system comprising one or more rollers, a number of sliders, a number of air bearings, a holonomic wheel system, holonomic wheels, mecanum wheels, omni wheels, poly wheels, a number of motors, an actuator system comprising one or more actuators, a track system, or some other type of movement device or system.

Movement system 136 may be used to move connection device 132 relative to supporting member 130 with at least one degree of freedom and up to six degrees of freedom. Moving connection device 132 relative to supporting member 130 may cause a location of control point 135 in three-dimensional space to change.

For example, movement system 136 may be used to at least one of translate connection device 132 or rotate connection device 132 relative to supporting member 130. For example, movement system 136 may be configured to translate connection device 132 relative to supporting member 130 with at least one degree of translational freedom and up to three degrees of translational freedom. Movement system 136 may be configured to rotate connection device 132 with at least one degree of rotational freedom and up to three degrees of rotational freedom. In this manner, connection device 132 may be linearly moved or translated relative to supporting member 130, rotated relative to supporting member 130, or both.

In this illustrative example, load-balancing structure 138 may be associated with support 128. In particular, load-balancing structure 138 may be associated with supporting member 130 of support 128. Load-balancing structure 138 may be smart spreader beam 170.

Set of connection devices 140 may be associated with load-balancing structure 138. As used herein, a "set of" items may include one or more items. In this manner, set of connection devices 140 may include one or more connection devices. A connection device in set of connection devices 140 may be implemented in a manner similar to connection device 132 described above.

Set of connection devices 140 may be positioned along load-balancing structure 138. A connection device in set of connection devices 140 may be movably associated with load-balancing structure 138 such that the connection device in set of connection devices 140 may be moved relative to load-balancing structure 138.

Each of set of connection devices 140 may be configured to connect to structure 116 at set of connection points 153 to form set of control points 142. A connection point in set of connection points 153 may be similar to connection point 133 described above. A control point in set of control points 142 may be similar to control point 135 described above.

In one illustrative example, set of connection points 153 form set of control points 142. Set of connection devices 140 may be configured to connect to structure 116 at set of control points 142 to hold at least a portion of structure 116 above work surface 115.

Connection device 143 may be an example of one of set of connection devices 140. Depending on the implementation, connection device 143 may be fixedly associated with load-balancing structure 138 or movably associated with load-balancing structure 138. For example, connection device 143 may have base 145. Base 145 may be either immovably or movably attached to load-balancing structure 138. Further, depending on the implementation, base 145 may be permanently attached to load-balancing structure 138 or removably attached to load-balancing structure 138.

Connection device 143 may include element 146. Element 146 may be movable relative to base 145. For example, when base 145 is fixedly attached to load-balancing structure 138 and unable to be moved in any manner relative to load-balancing structure 138, element 146 may be able to move relative to base 145. Element 146 may be used to connect connection device 143 to location 151 on structure 116 to form connection point 147. Connection point 147 may be an example of one of set of connection points 153. In one illustrative example, connection point 147 may form control point 149, which may be an example of one of set of control points 142. Thus, element 146 may be used to connect connection device 143 to location 151 to form control point 149. Connection point 147 and control point 149 may be similar to connection point 133 and control point 135, respectively, described above. In other illustrative examples, control point 149 may be offset from connection point 147 formed between element 146 and structure 116.

For example, without limitation, when structure 116 is for wing 102, control point 149 may be a location on a spar assembly, a rib assembly, a skin panel, a control surface, or some other type of component used to form wing 102. Control point 149 may be controlled such that location 151 of control point 149 is brought into alignment with reference coordinate system 157 for wing 102, global coordinate system 139 for manufacturing environment 100, or reference coordinate system 157 for aircraft 104. In this manner, control point 149 may be at any location 151 on structure 116 to which connection device 143 connects such that this location 151 may be controlled with respect to some reference coordinate system 157.

Connection device 143 may also include movement system 148. Movement system 148 may be used to move control point 149 from one location in three-dimensional space to another location in three-dimensional space. For example, without limitation, movement system 148 may be used to move element 146 relative to load-balancing structure 138 to move control point 149. In this manner, a location of control point 149 may be moved with at least one degree of freedom and up to six degrees of freedom. Movement system 148 may be used to translate control point 149 in one or more linear directions, rotate control point 149 about one or more axes, or both.

Movement system 148 may take a number of different forms. For example, without limitation, movement system 148 may include at least one of a rail system, a wheel system comprising one or more wheels, a roller system comprising one or more rollers, a number of sliders, a number of air bearings, a holonomic wheel system, holonomic wheels, mecanum wheels, omni wheels, poly wheels, a number of motors, an actuator system comprising one or more actuators, a track system, or some other type of movement device or system.

When set of connection devices 140 includes multiple connection devices attached to load-balancing structure 138, set of connection devices 140 may be spaced apart along a length of load-balancing structure 138. For example, two, three, four, five, or some other number of connection devices may be spread out along load-balancing structure 138. Depending on the implementation, these connection devices may be equally spaced at fixed intervals along load-balancing structure 138 or spaced at intervals that may change by moving one or more of the connection devices.

Load-balancing structure 138 may balance number of loads 144 applied to set of connection devices 140 by structure 116 being connected to set of connection devices 140 at set of control points 142. In particular, load-balancing structure 138 may distribute number of loads 144 along load-balancing structure 138 to support 128.

In one illustrative example, load-balancing structure 138 may take the form of a beam. In other illustrative examples, load-balancing structure 138 may take the form of any physical structure having a shape and size configured to balance out number of loads 144. In other words, load-balancing structure 138 may be any structure configured to distribute number of loads 144 applied to load-balancing structure 138 by set of connection devices 140 from set of connection devices 140 to support 128.

In some illustrative examples, support 128 may be first support 150. Plurality of supports 113 may include second support 152. Load-balancing structure 138 may be associated with both first support 150 and second support 152. For example, load-balancing structure 138 may have first end 154 associated with first support 150 and second end 156 associated with second support 152.

In one illustrative example, movement system 160 may be associated with at least one of load-balancing structure 138, first support 150, or second support 152. Movement system 160 may be configured to move load-balancing structure 138 from one location in three-dimensional space to another location in three-dimensional space.

For example, without limitation, movement system 160 may be used to move load-balancing structure 138 relative to base structure 129 of support 128. In this manner, a location of load-balancing structure 138 relative to support 128 may be moved with at least one degree of freedom. For example, without limitation, movement system 160 may be used to translate load-balancing structure 138 in one or more linear directions, rotate load-balancing structure 138 about one or more axes, or both.

Thus, drivable support system 114 may have plurality of connection devices 163 that connect to structure 116 at plurality of connection points 161. In particular, each of plurality of connection devices 163 may connect to structure 116 to form at least one corresponding connection point in plurality of connection points 161.

Plurality of connection devices 163 may include connection device 132 associated with support 128 and set of connection devices 140 associated with load-balancing structure 138. Other supports in plurality of supports 113 may have connection devices included in plurality of connection devices 163. Plurality of connection points 161 may include connection point 133 and set of connection points 153. Further, plurality of connection points 161 may provide plurality of control points 141 relative to structure 116. Plurality of control points 141 may include control point 135 and set of control points 142.

Plurality of control points 141 may be points of interest for use in controlling the position of structure 116. For example, each of plurality of control points 141 may be movable such that a corresponding portion of structure 116 may be moved.

For example, without limitation, each of plurality of connection devices 163 may have an element, similar to one of number of elements 134 or element 146, that connects to a location on structure 116 to form a corresponding one of plurality of connection points 161. This corresponding one of plurality of connection points 161 may, in turn, provide a corresponding one of plurality of control points 141 on structure 116. Depending on the implementation, plurality of control points 141 may be points that are offset from plurality of connection points 161 provided by plurality of connection devices 163 or directly co-located with plurality of connection points 161.

Each of plurality of devices 110 and each of plurality of connection devices 163 may be operated based on reference coordinate system 157, global coordinate system 139 for manufacturing environment 100, or both. Plurality of control points 141 may have known locations with respect to reference coordinate system 157. Thus, once the locations of plurality of control points 141 have been identified within global coordinate system 139, which may be identified using metrology system 162, plurality of control points 141 may be used to transition between global coordinate system 139 and reference coordinate system 157.

As depicted, metrology system 162 may include plurality of sensor systems 196. Plurality of sensor systems 196 in metrology system 162 may be used to generate metrology data 194. Metrology data 194 may then be used to connect plurality of connection devices 163 to structure 116. Further, metrology system 162 may provide feedback control for controlling the location of each of plurality of control points 141 within a three-dimensional coordinate system.

In this illustrative example, plurality of sensor systems 196 may include at least one of plurality of target systems 164 or plurality of transmitters 165. Each of plurality of target systems 164 may be associated with a corresponding one of plurality of connection devices 163. In particular, each of plurality of target systems 164 may be associated with the element of a corresponding one of plurality of connection devices 163. Further, each of plurality of target systems 164 may then correspond to a corresponding control point in plurality of control points 141. Each of plurality of target systems 164 may include three or more sensors or sensor devices.

In this illustrative example, steering direction 167 may be provided for various devices of plurality of devices 110 in flexible manufacturing system 106. As one example, steering direction 167 may be provided for plurality of drivable supports 117 when plurality of drivable supports 117 is configured to move through manufacturing environment 100. Steering direction 167 also may be provided for plurality of devices 110 moving between positions 197 on work surface 115.

Steering direction 167 may be provided in the form of commands, instructions, path generation, physically changing the direction of movement of the device, and other methods of guidance. In this illustrative example, steering direction 167 may dynamically change as conditions within manufacturing environment 100 change.

Steering direction 167 may be provided by at least one of an on-board controller, a system controller, a human operator, or some other suitable device. In other illustrative examples, each one of plurality of supports 113, plurality of devices 110, or both may steer itself, not under the direction of a controller.

The illustration of manufacturing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, support 128 may not be used to form plurality of connection points 161 and thereby, plurality of control points 141. Rather, load-balancing structure 138 may be used to form set of control points 142 that includes two or more control points. Load-balancing structure 138 may be associated with support 128 such that support 128 is positioned between these two control points.

In this manner, any configuration of control points may be created using at least one of plurality of supports 113 and load-balancing structure 138. In some illustrative examples, first support 150 and second support 152 may be used to support load-balancing structure 138 but not to provide control points. Rather, all control points may be provided along load-balancing structure. In other illustrative examples, a single support, such as support 128, and a single load-balancing structure, such as load-balancing structure 138, may be used together to create three control points, four control points, five control points, or some other number of control points. Each of these control points may be formed by either a connection device associated with the single load-balancing structure or the support.

Similarly, a single load-balancing structure, such as load-balancing structure 138, may be supported by multiple supports to form a system capable of providing two control points, three control points, four control points or some other number of control points. Each of these control points may be formed by a connection device associated with the load-balancing structure or one of the supports.

In still other illustrative examples, a connection device in set of connection devices 140 may be associated with load-balancing structure 138 through some other type of structure. For example, without limitation, a connection device in set of connection devices 140 may be associated with a second load-balancing structure attached to load-balancing structure 138 in which the second load-balancing structure is substantially perpendicular to or oriented at some other angle relative to load-balancing structure 138. As one illustrative example, the second load-balancing structure may be vertical while load-balancing structure 138 may be horizontal.

Thus, support system 112 may provide a desired ratio for set of control points 142. In one illustrative example, load-balancing structure 138 may be smart spreader beam 170 positioned between first support 150 and second support 152. As depicted, first support 150 may take the form of first automated guided vehicle 191, and second support 152 may take the form of second automated guided vehicle 192. First automated guided vehicle 191 and second automated guided vehicle 192 may be controlled using metrology data 194 generated by plurality of sensor systems 196 in metrology system 162.

In the illustrative examples, first automated guided vehicle 191 and second automated guided vehicle 192 may move in a coordinated manner. Also, smart spreader beam 170 may be moved by movement system 160 independently of first automated guided vehicle 191 and second automated guided vehicle 192. In other words, smart spreader beam 170 may move relative to first automated guided vehicle 191 and second automated guided vehicle 192 moving. The movement of smart spreader beam 170 by first automated guided vehicle 191 and second automated guided vehicle 192, movement system 160, or both also may move set of control points 142. As a result, a higher resolution of control may be achieved in controlling set of control points 142.

Figure 2:
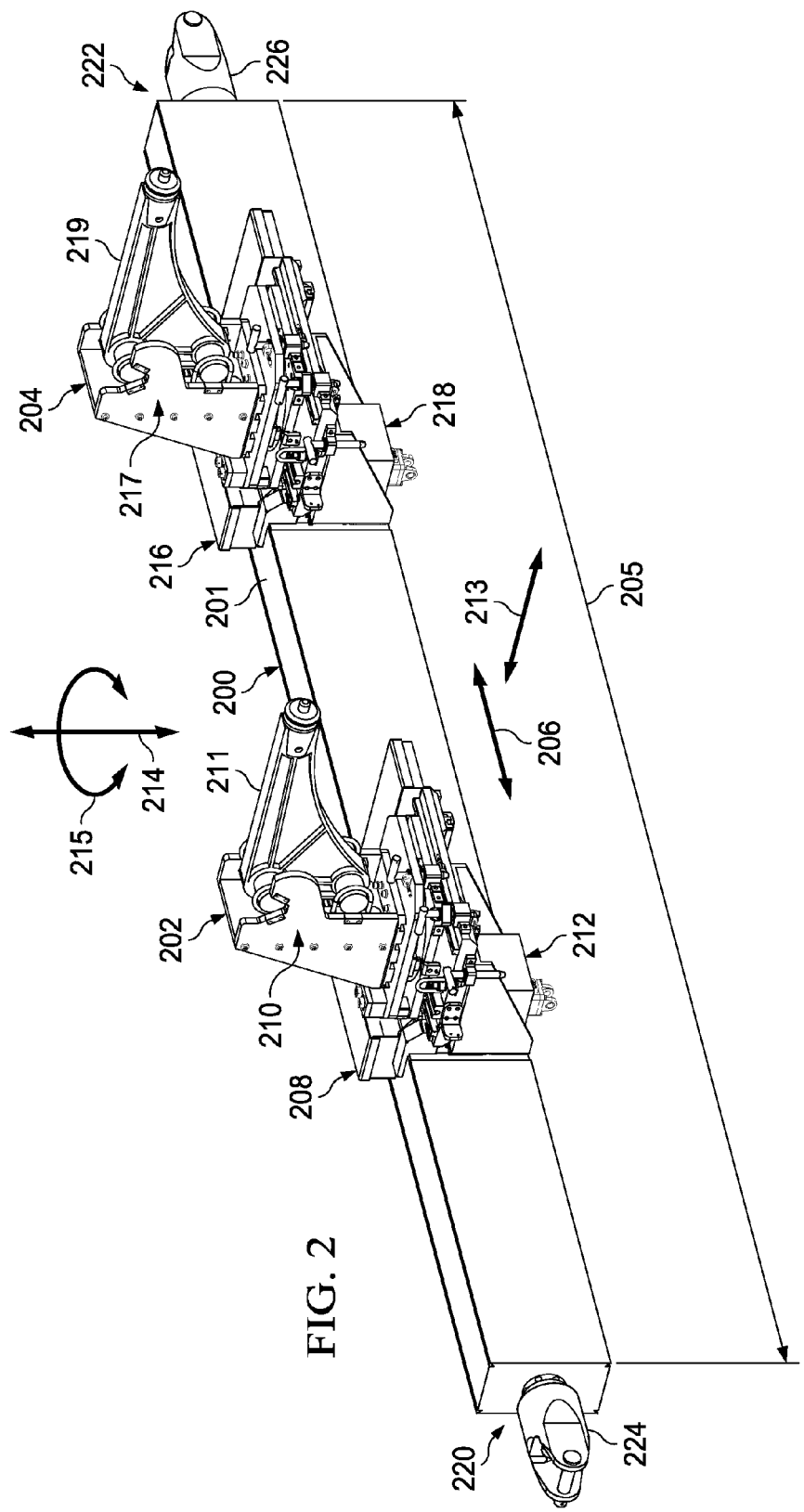
FIG. 2 is an illustration of an isometric view of connection devices associated with a load-balancing structure in accordance with an illustrative embodiment.

With reference now to FIG. 2, an illustration of an isometric view of connection devices associated with a load-balancing structure is depicted in accordance with an illustrative embodiment. In this illustrative example, load-balancing structure 200, connection device 202, and connection device 204 are shown. Load-balancing structure 200 may be an example of one implementation for load-balancing structure 138 in FIG. 1. Connection device 202 and connection device 204 may be an example of one implementation for set of connection devices 140 in FIG. 1.

As depicted, load-balancing structure 200 may take the form of beam 201. Connection device 202 and connection device 204 may be fixedly associated with beam 201. In particular, the location of connection device 202 and the location of connection device 204 along beam 201 may be fixed. However, in other illustrative examples, each of connection device 202 and connection device 204 may be movable along length 205 of beam 201 in a direction substantially parallel to y-axis 206.

In this illustrative example, connection device 202 may include base 208, element 210, and movement system 212. Base 208, element 210, and movement system 212 may be examples of implementations for base 145, element 146, and movement system 148, respectively, in FIG. 1. Base 208 of connection device 202 may be attached to beam 201. Element 210 may be movably associated with base 208.

Fitting 211 may be associated with element 210. In some illustrative examples, fitting 211 may be considered part of element 210. In this illustrative example, fitting 211 may be a component that is removably associated with element 210.

Fitting 211 may be used to connect connection device 202 to a structure (not shown), such as, for example, without limitation, structure 116 in FIG. 1. In particular, fitting 211 may be used to connect connection device 202 to this structure at a control point (not shown), such as, for example, without limitation, control point 149 in FIG. 1.

Further, movement system 212 may be configured to move element 210 relative to base 208 with at least one degree of freedom. For example, movement system 212 may be configured to move element 210 in a direction substantially parallel to x-axis 213, in a direction substantially parallel to y-axis 206, and in a direction substantially parallel to z-axis 214. Further, movement system 212 may be configured to move element 210 in the direction of arrow 215 about z-axis 214. Movement of element 210 by movement system 212 may cause the control point to which element 210 is connected to move from one location in three-dimensional space to a second location in three-dimensional space.

Connection device 204 may include base 216, element 217, and movement system 218. Base 216 of connection device 204 may be attached to beam 201. Element 217 may be movably associated with base 216.

Fitting 219 may be associated with element 217. In some illustrative examples, fitting 219 may be considered part of element 217. In this illustrative example, fitting 219 may be a component that is removably associated with element 217. The implementation for fitting 219 may take different forms depending on the control point that fitting 219 is being attached to in the illustrative examples.

Fitting 219 may be used to connect connection device 204 to a structure (not shown), such as, for example, without limitation, structure 116 in FIG. 1. In particular, fitting 219 may be used to connect connection device 204 to this structure at a control point (not shown), such as, for example, without limitation, control point 149 in FIG. 1.

Further, movement system 218 may be configured to move element 217 relative to base 216. For example, movement system 218 may be configured to move element 217 in a direction substantially parallel to x-axis 213, in a direction substantially parallel to y-axis 206, and in a direction substantially parallel to z-axis 214. Further, movement system 218 may be configured to move element 217 in the direction of arrow 215 about z-axis 214. Movement of element 217 by movement system 218 may cause the control point to which element 217 is connected to move from one location in three-dimensional space to a second location in three-dimensional space.

Each of movement system 212 and movement system 218 may be independently controlled. In this illustrative example, each of movement system 212 and movement system 218 may be controlled by a system controller (not shown). Connection device 202 and connection device 204 may be moved independently relative to each other. In this manner, the control point to which connection device 202 is connected may be moved independently of the control point to which connection device 204 is connected.

As depicted, beam 201 may have first end 220 and second end 222. Beam 201 may have first fitting 224 at first end 220. First fitting 224 may be used to connect first end 220 of beam 201 to a support (not shown), such as, for example, without limitation, support 128 in FIG. 1. Further, beam 201 may have second fitting 226 at second end 222. Second fitting 226 may be used to connect second end 222 of beam 201 to a support (not shown), such as, for example, without limitation, support 128 in FIG. 1.

Figure 3:
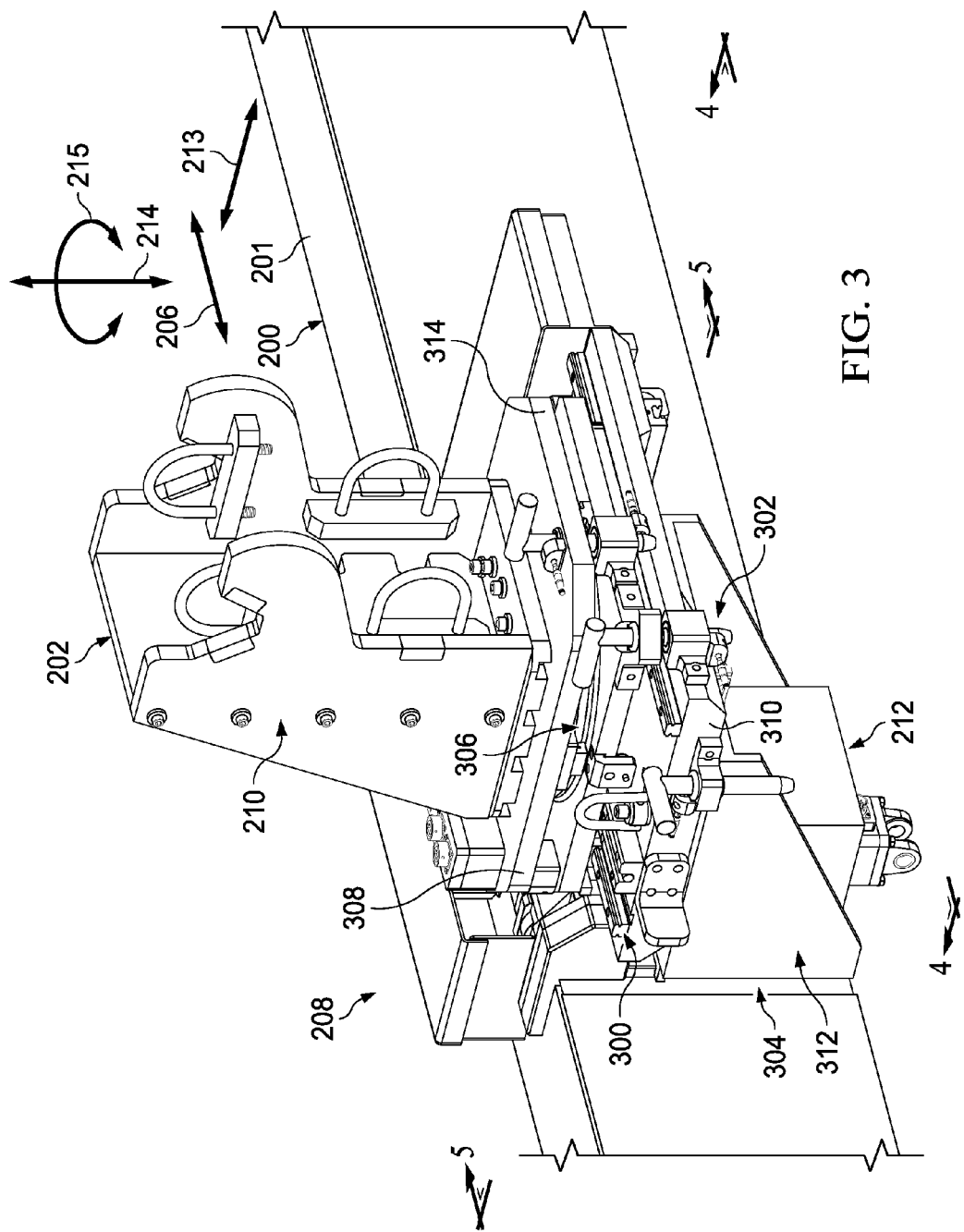
FIG. 3 is an illustration of an enlarged isometric view of a connection device in accordance with an illustrative embodiment.

With reference now to FIG. 3, an illustration of an enlarged isometric view of connection device 202 from FIG. 2 is depicted in accordance with an illustrative embodiment. In FIG. 3, fitting 211 of element 210 from FIG. 2 is not shown.

Element 210 may be moved relative to base 208 by movement system 212. As depicted, movement system 212 may include first rail system 300, second rail system 302, third rail system 304, and rotatable device 306. Each of first rail system 300, second rail system 302, and third rail system 304 may provide a different degree of translational freedom to element 210 of connection device 202. As used herein, a "rail system," such as one of first rail system 300, second rail system 302, and third rail system 304, may include one or more rails.

Of course, in other illustrative examples, movement system 212 may take some other form. For example, without limitation, movement system 212 may include at least one of tracks, bearings, sliders, gliders, air bearings, rollers, wheels, holonomic wheels, mecanum wheels, omni wheels, poly wheels, or some other type of movement device.

For example, without limitation, connection device 202 may include member 308, member 310, and member 312. Element 210 may be associated with member 308. Member 308 may be configured to move along first rail system 300 in a direction substantially parallel to y-axis 206. In particular, member 308 may be configured to slide along first rail system 300 in a direction substantially parallel to y-axis 206. Element 210 may be associated with member 308 in a manner such that element 210 moves in a same direction and by a substantially same distance as member 308 when member 308 moves along first rail system 300.

Similarly, element 210 may be associated with member 310. Member 310 may be configured to move along second rail system 302 in a direction substantially parallel to x axis 213. In particular, member 310 may be configured to slide along second rail system 302 in a direction substantially parallel to x axis 213. Element 210 may be associated with member 310 in a manner such that element 210 moves in a same direction and by a substantially same distance as member 310 when member 310 moves along second rail system 302.

Further, element 210 may be associated with member 312. Member 312 may be configured to move along third rail system 304 in a direction substantially parallel to z-axis 214. In particular, member 312 may be configured to slide along third rail system 304 in a direction substantially parallel to z-axis 214. Element 210 may be associated with member 312 in a manner such that element 210 moves in a same direction and by a substantially same distance as member 312 when member 312 moves along third rail system 304.

Further, element 210 may be associated with rotatable device 306 through member 314. Rotatable device 306 may be configured to rotate in the direction of arrow 215 about z-axis 214. Member 314 may be connected to rotatable device 306 such that member 314 rotates with rotatable device 306. In particular, member 314 and element 210 connected to member 314 may rotate in a same direction and by substantially a same amount as rotatable device 306.

In this manner, movement system 212 may allow element 210 to be moved with at least four degrees of freedom. These four degrees of freedom include three translational degrees of freedom and one rotational degree of freedom. Connection device 204 in FIG. 2 may be implemented in a manner similar to the implementation of connection device 202 described in FIG. 3.

Figure 4:
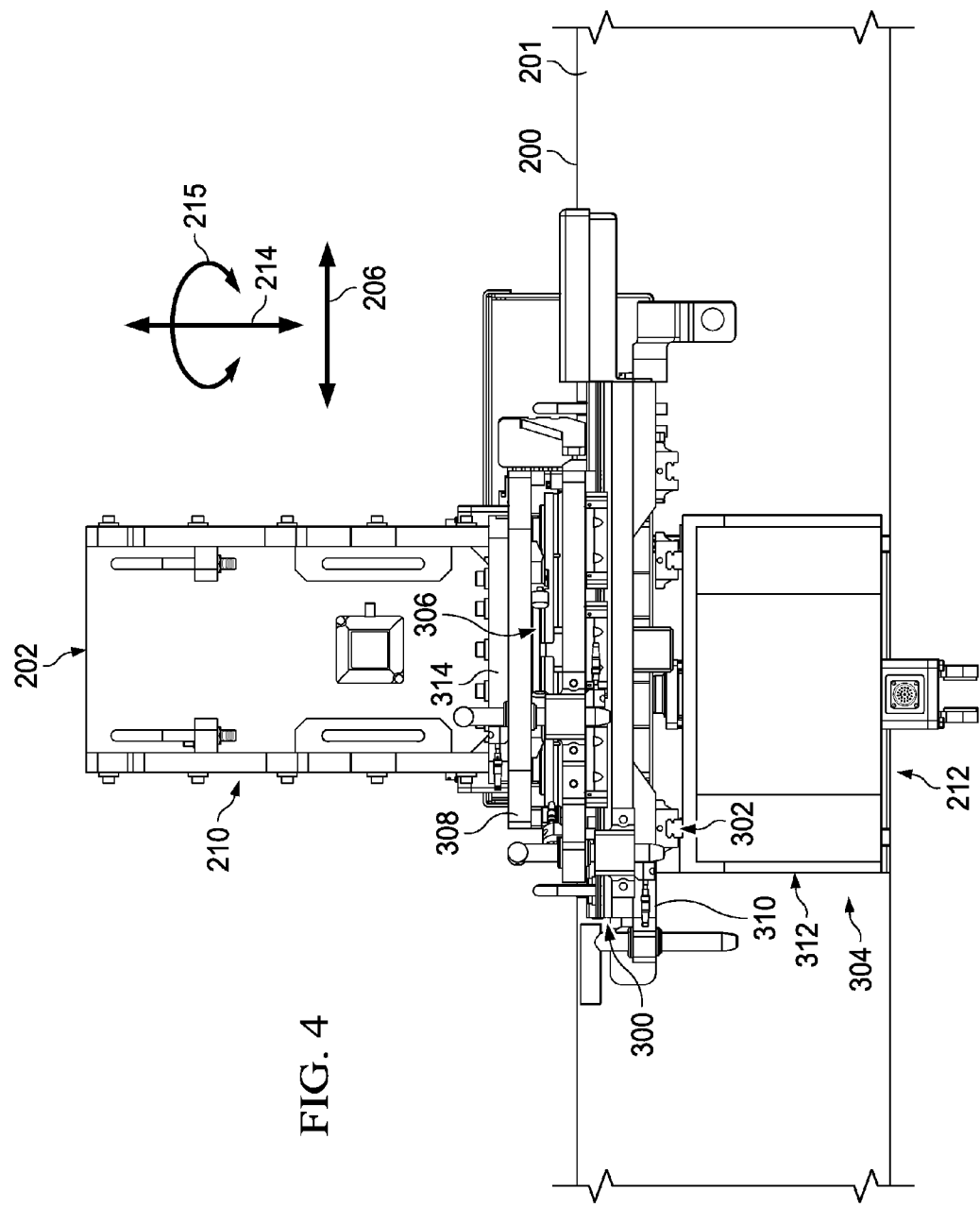
FIG. 4 is an illustration of a front view of a connection device in accordance with an illustrative embodiment.

With reference now to FIG. 4, an illustration of a front view of connection device 202 from FIGS. 2-3 is depicted in accordance with an illustrative embodiment. In this illustrative example, a front view of connection device 202 from FIGS. 2-3 may be depicted in the direction of lines 4-4 in FIG. 3.

Figure 5:
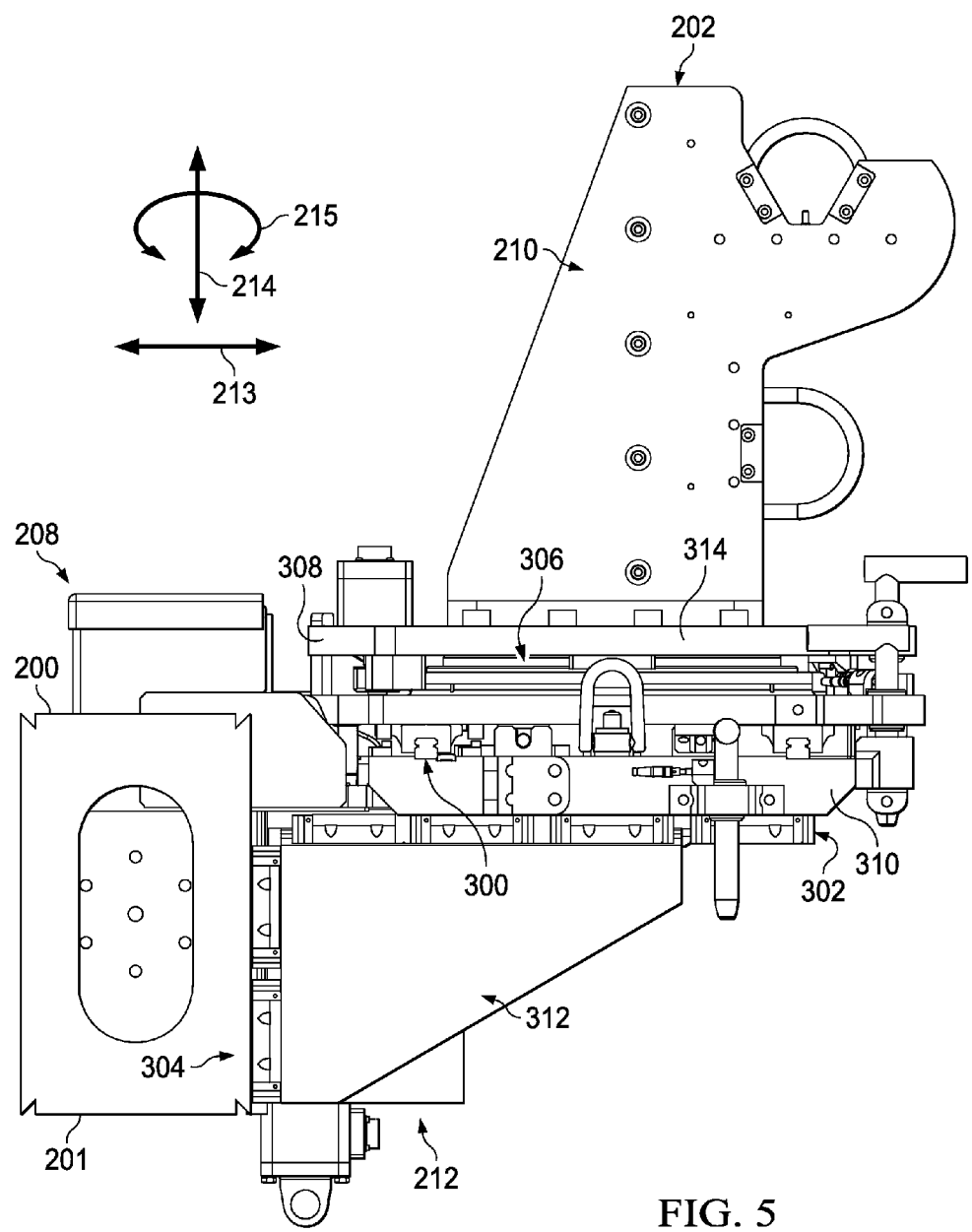
FIG. 5 is an illustration of a side view of a connection device in accordance with an illustrative embodiment.

With reference now to FIG. 5, an illustration of a side view of connection device 202 from FIGS. 2-4 is depicted in accordance with an illustrative embodiment. In this illustrative example, a side view of connection device 202 shown in FIGS. 2-4 may be depicted in the direction of lines 5-5 in FIG. 3.

Figure 6:
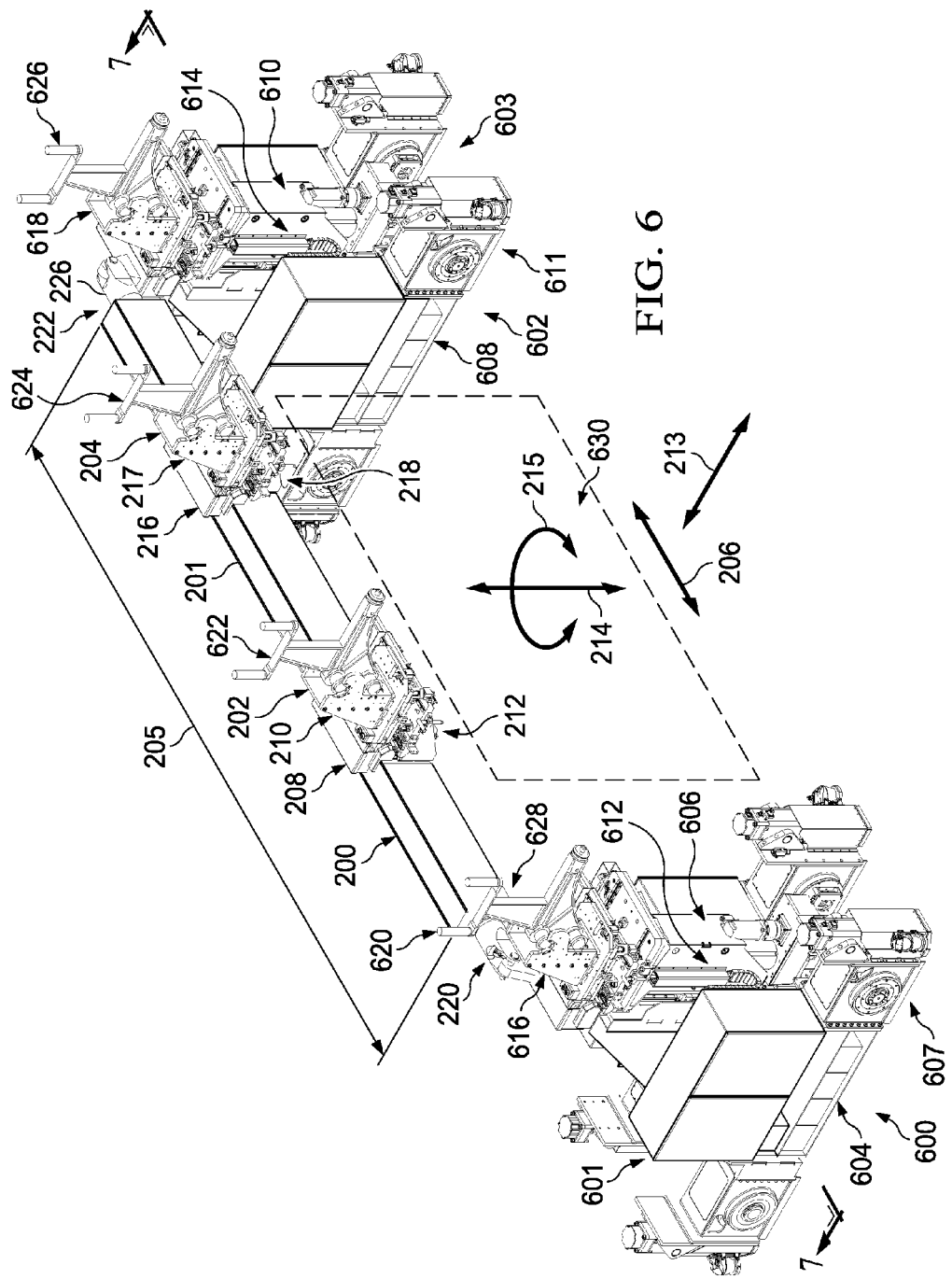
FIG. 6 is an illustration of an isometric view of a beam attached to two supports in accordance with an illustrative embodiment.

With reference now to FIG. 6, an illustration of an isometric view of beam 201 from FIG. 2 attached to two supports is depicted in accordance with an illustrative embodiment. In this illustrative example, beam 201 may be attached to first support 600 and second support 602. First support 600 and second support 602 may be examples of implementations for first support 150 and second support 152, respectively, in FIG. 1.

In this illustrative example, first support 600 and second support 602 may be a first mobile support and a second mobile support, respectively. In particular, first support 600 and second support 602 may take the form of first drivable support 601 and second drivable support 603, respectively. As depicted, first drivable support 601 is implemented as a first autonomous guided vehicle (AGV) and second drivable support 603 may be implemented as a second autonomous guided vehicle.

As depicted, first end 220 of beam 201 may be attached to first support 600 and second end 222 of beam 201 may be attached to second support 602. In this illustrative example, first support 600 may include base structure 604, supporting member 606, and drive system 607. Second support 602 may include base structure 608, supporting member 610, and drive system 611.

Base structure 604, supporting member 606, and drive system 607 may be examples of implementations for base structure 129, supporting member 130, and drive system 131, respectively, in FIG. 1. Similarly, base structure 608, supporting member 610, and drive system 611 may be examples of implementations for base structure 129, supporting member 130, and drive system 131, respectively, in FIG. 1.

In this illustrative example, all of the components that make up first support 600 may be associated with base structure 604 in this illustrative example. Drive system 607 may be used to move base structure 604 of first support 600, and thereby the entirety of first support 600. For example, without limitation, drive system 607 may be capable of moving first support 600 in any direction along a surface, such as a factory floor (not shown).

Supporting member 606 may be movably associated with base structure 604 of first support 600. Supporting member 606 may be moved in a direction substantially parallel to z-axis 214. In particular, first support 600 may have movement system 612 that may move supporting member 606 in this z-direction.

Similarly, supporting member 610 may be movably associated with base structure 608 of second support 602. Supporting member 610 may be moved in a direction substantially parallel to z-axis 214. In particular, second support 602 may have movement system 614 that may move supporting member 610 in this z-direction.

As depicted, first support 600 may also include connection device 616 associated with supporting member 606. Second support 602 may include connection device 618 associated with supporting member 610. Each of connection device 616 and connection device 618 may be implemented in a manner similar to the implementation of connection device 202 shown in FIGS. 2-5 above.

Together, connection device 202, connection device 204, connection device 616, and connection device 618 may provide the potential for four control points on a structure that is at least partially being supported using first support 600 and second support 602. As one illustrative example, first support 600 and second support 602 may be moved onto a work surface (not shown), such as work surface 115 described in FIG. 1. First support 600 and second support 602 may be moved along the work surface in order to roughly position first support 600 and second support 602 relative to a structure (not shown), such as, for example, without limitation, structure 116 in FIG. 1.

Once first support 600 and second support 602 have been roughly positioned relative to the structure, movement system 612 of first support 600 and movement system 614 of second support 602 may be used to more finely position connection device 202, connection device 204, connection device 616, and connection device 618 relative to the structure. For example, without limitation, movement system 612 may raise supporting member 606 upwards with respect to z-axis 214 such that connection device 616 associated with supporting member 606 is also raised. Movement system 614 may raise supporting member 610 upwards with respect to z-axis 214 such that connection device 616 associated with supporting member 606 is also raised. Moving supporting member 606 and supporting member 610 in this manner may also cause beam 201 attached to these supporting members to be raised upwards with respect to z-axis 214.

Thereafter, the individual movement systems of connection device 202, connection device 204, connection device 616, and connection device 618 may be used to more precisely position the elements of these connection devices relative to the structure. For example, without limitation, movement system 212 may be used to more precisely position element 210 of connection device 202 relative to the structure such that a control point may be formed where element 210 contacts the structure. Movement system 218 may be used to more precisely position element 217 of connection device 204 relative to the structure such that a control point may be formed where element 217 contacts the structure. Connection device 616 and connection device 618 may be operated in a similar manner to form two more control points.

In this manner, four control points may be provided. Each of these four control points may be independently controlled using connection device 202, connection device 204, connection device 616, and connection device 618. Even after these four control points have been formed, connection device 202, connection device 204, connection device 616, and connection device 618 may be further able to control the locations of these control points within a three-dimensional space to control the position of the structure being supported by these connection devices.

In this illustrative example, target system 620, target system 622, target system 624, and target system 626 may be associated with connection device 616, connection device 202, connection device 204, and connection device 618, respectively. Target system 620, target system 622, target system 624, and target system 626 may be an example of one implementation for a portion of plurality of target systems 164 in FIG. 1.

Target system 620, target system 622, target system 624, and target system 626 may correspond to the control points to be formed using connection device 616, connection device 202, connection device 204, and connection device 618, respectively. These target systems may be part of metrology system 628. Metrology system 628 may also include transmitters (not shown in this view). Each of target system 620, target system 622, target system 624, and target system 626 may include a group of targets that generate metrology data for use in controlling operation of the movement systems of connection device 616, connection device 202, connection device 204, and connection device 618, respectively.

In this illustrative example, having beam 201 with connection device 202 and connection device 204 positioned along beam 201 may allow control points to be provided without requiring additional large supports, such as first support 600 and second support 602. In particular, beam 201 allows open space 630 to be provided to allow any number or combination of human operators, tools, robotic devices, equipment, drivable tools, and other types of items to pass through open space 630 during manufacturing. Open space 630 allows improved access to the structure that is supported using connection device 202, connection device 204, connection device 616, and connection device 618.

Further, beam 201 may distribute the loads applied to connection device 202, connection device 204, connection device 616, and connection device 618 by the structure supported using these connection devices. The loads may be distributed along length 205 of beam 201 and to first support 600 and second support 602. In this manner, the components of connection device 202, connection device 204, connection device 616, and connection device 618 used to support the structure may have reduced stiffness and therefore may be lighter in weight.

Figure 7:
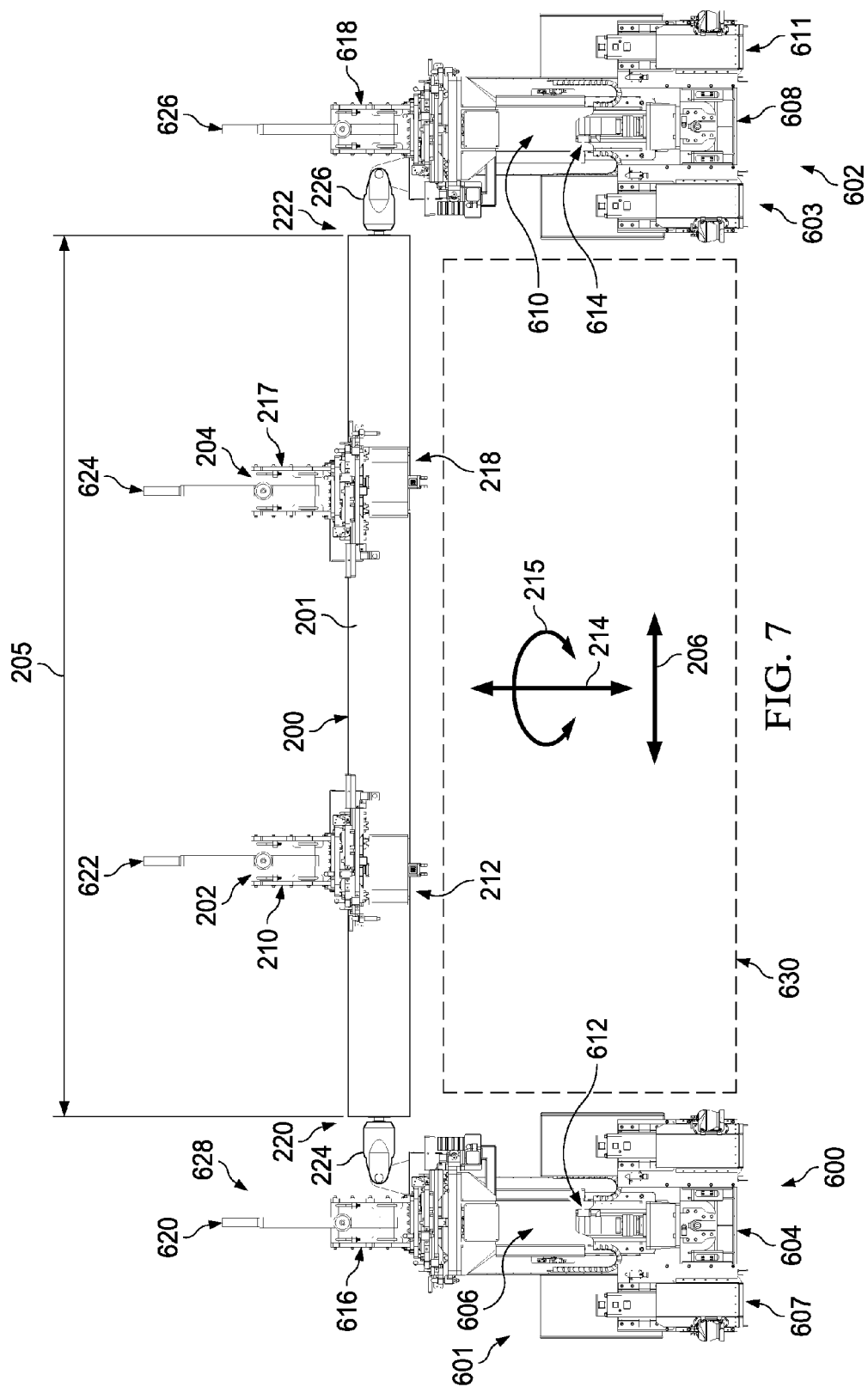
FIG. 7 is an illustration of a front view of a beam, a first support, and a second support in accordance with an illustrative embodiment.

With reference now to FIG. 7, an illustration of a front view of beam 201, first support 600, and second support 602 from FIG. 6 is depicted in accordance with an illustrative embodiment. In this illustrative example, a front view of beam 201, first support 600, and second support 602 from FIG. 6 may be depicted in the direction of lines 7-7 in FIG. 6.

Figure 8:
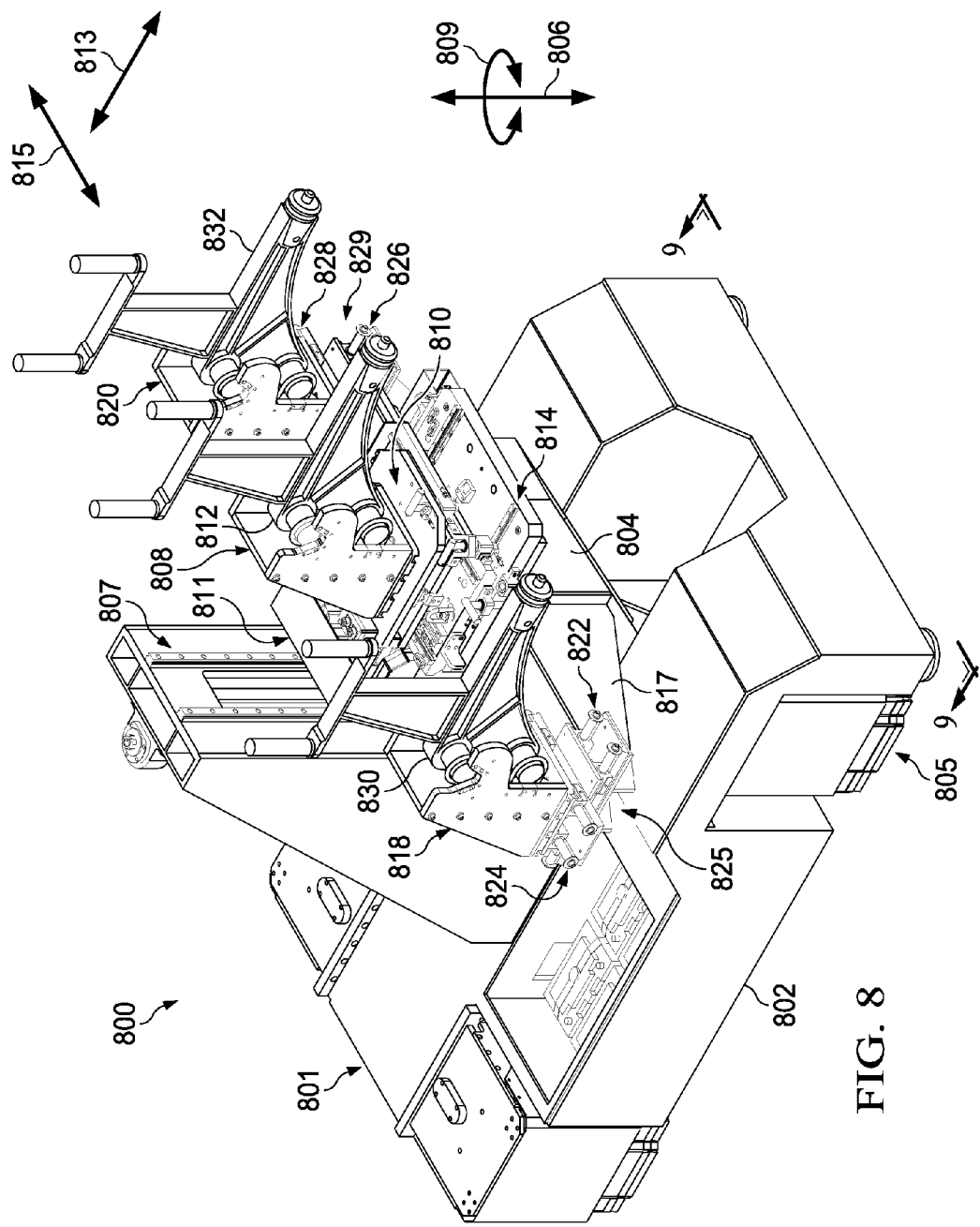
FIG. 8 is an illustration of an isometric view of a support in accordance with an illustrative embodiment.

With reference now to FIG. 8, an illustration of an isometric view of a support is depicted in accordance with an illustrative embodiment. In this illustrative example, support 800 may be a mobile support. In particular, support 800 may take the form of drivable support 801. As depicted, first drivable support 601 from FIG. 6 may be implemented as an autonomous guided vehicle (AGV).

Support 800 may include base structure 802, supporting member 804, and drive system 805. In this illustrative example, base structure 802, supporting member 804, and drive system 805 may be examples of implementations for base structure 129, supporting member 130, and drive system 131, respectively, in FIG. 1.

In this illustrative example, all of the components that make up support 800 may be associated with base structure 802 in this illustrative example. Drive system 805 may be used to move base structure 802 of support 800, and thereby the entirety of support 800. For example, without limitation, drive system 805 may be capable of moving support 800 in any direction along a surface, such as a factory floor (not shown).

Supporting member 804 may be movably associated with base structure 802 of support 800. Support 800 may include rail system 807. A movement system (not visible in this view) may move supporting member 804 in a direction substantially parallel to z-axis 806 along rail system 807. In particular, support 800 may have movement system 811 that may move supporting member 804 in a direction substantially parallel to z-axis 806.

As depicted, support 800 may also include connection device 808 associated with supporting member 804. Connection device 808 may be implemented in a manner similar to the implementation of connection device 202 shown in FIGS. 2-5 above. In particular, connection device 808 may include base 810, element 812, and movement system 814. Base 810, element 812, and movement system 814 may be examples of implementations for base 145, element 146, and movement system 148, respectively, in FIG. 1.

Base 810 may be associated with supporting member 804 such that movement of supporting member 804 in a direction substantially parallel to z-axis 806 causes movement of connection device 808 in a same direction and by substantially the same amount. Element 812 may be used to connect connection device 808 to a structure (not shown), such as, for example, without limitation, structure 116 in FIG. 1.

Movement system 814 may be used to move element 812 relative to base 810 and thereby, supporting member 804, such that a three-dimensional location of a control point formed using element 812 may be controlled. In this illustrative example, movement system 814 may provide element 812 with at least three degrees of translational freedom and one degree of rotational freedom, similar to movement system 212 in FIG. 2. In particular, movement system 814 may allow element 812 to translate relative to base 810, and thereby supporting member 804, in a direction substantially parallel to z-axis 806, in a direction substantially parallel to x-axis 813, and in a direction substantially parallel to y-axis 815. Further, movement system 814 may be configured to rotate element 812 in the direction of arrow 809 about z-axis 806.

As depicted, load-balancing structure 817 may be associated with supporting member 804. Load-balancing structure 817 may be an example of one implementation for load-balancing structure 138 in FIG. 1. In this illustrative example, load-balancing structure 817 may be fixedly associated with supporting member 804 such that movement of supporting member 804 in a direction substantially parallel to z-axis 806 causes movement of connection device 808 in a same direction and by substantially the same amount.

Connection device 818 and connection device 820 may be associated with load-balancing structure 817. Connection device 818 and connection device 820 may be an example of one implementation for set of connection devices 140 associated with load-balancing structure 138 in FIG. 1.

As depicted, connection device 818 may have rail system 822 and rail system 824, which together form movement system 825. Rail system 822 and rail system 824 may allow connection device 818 to translate in a direction substantially parallel to x-axis 813 and in a direction substantially parallel to y-axis 815, respectively. In some illustrative examples, movement system 825 may also move in a direction substantially parallel to z-axis 806 such that the height of connection device 818 may be varied slightly based on metrology system feedback.

Similarly, connection device 820 may have rail system 826 and rail system 828, which together form movement system 829. Rail system 826 and rail system 828 may allow connection device 820 to translate in a direction substantially parallel to x-axis 813 and in a direction substantially parallel to y-axis 815, respectively. In some illustrative examples, movement system 829 may also move in a direction substantially parallel to z-axis 806 such that height of connection device 820 may be varied slightly based on metrology system feedback.

In this illustrative example, connection device 818 may include member 830 and connection device 820 may include member 832. An element (not shown), such as element 812 of connection device 808, may be removably attached to each of member 830 and member 832. This element may be different for each of connection device 818 and connection device 820, depending on the implementation. In some cases, the same type of element may be removably attached to member 830 and member 832. The type of element removably attached to each of member 830 and member 832 may be selected based on the portion of a structure to be supported using connection device 818 and connection device 820, respectively.

As depicted, load-balancing structure 817 may be rigidly associated with supporting member 804 such that connection device 818 and connection device 820 are positioned lower than connection device 808 with respect to z-axis 806. In this manner, support 800 may be used to provide control points at different planes along z-axis 806 relative to a work surface.

Further, in this illustrative example, load-balancing structure 817 may allow connection device 818 and connection device 820 to be positioned more closely to connection device 808 with respect to y-axis 815 than would be possible using, for example, without limitation, another support or a beam and another support. Load-balancing structure 817 may distribute the loads applied to connection device 818 and connection device 820 to support 800 such that these connection devices may be designed lighter and with reduced stiffness.

Drive system 805 may allow support 800 to be roughly positioned relative to a structure. The movement system (not visible in this view) used to move supporting member 804 along rail system 807 may be used to more finely position connection device 808, connection device 818, and connection device 820. Further, movement system 811, movement system 825, and movement system 829 of connection device 808, connection device 818, and connection device 820, respectively, may be used to move the elements of these connection devices relative to supporting member 804 and load-balancing structure 817 to more precisely position the control points formed by these connection devices. In particular, the elements of these connection devices may be driven to more precisely position or reposition the control points formed by these connection devices.

Figure 9:
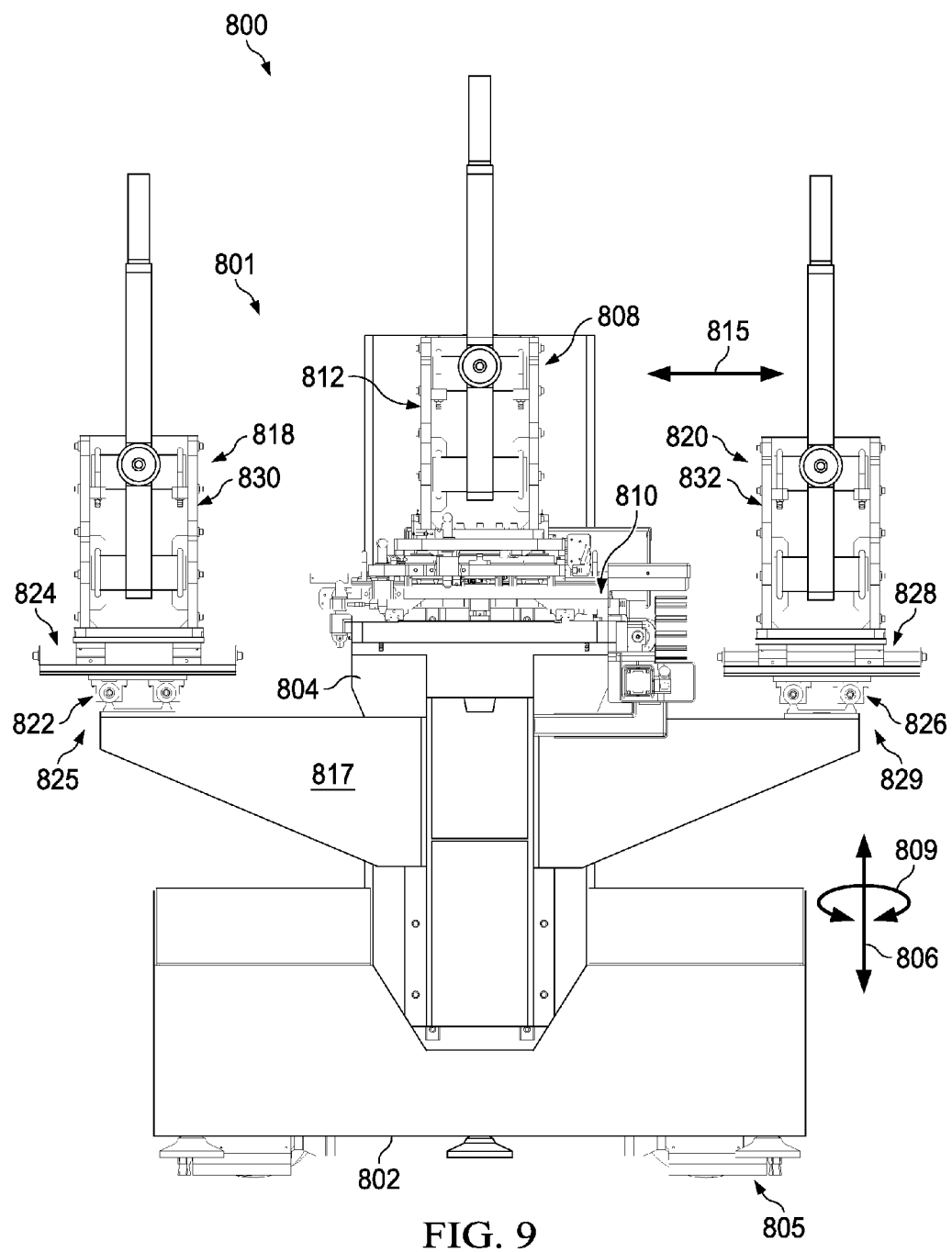
FIG. 9 is an illustration of a front view of a support in accordance with an illustrative embodiment.

With reference now to FIG. 9, an illustration of a front view of support 800 from FIG. 8 is depicted in accordance with an illustrative embodiment. In this illustrative example, a front view of support 800 from FIG. 8 may be depicted in the direction of lines 9-9 in FIG. 8. In this illustrative example, element 812 has been removably associated with member 830 of connection device 818. Further, element 812 has been removably associated with member 832 of connection device 820.

Figure 10:
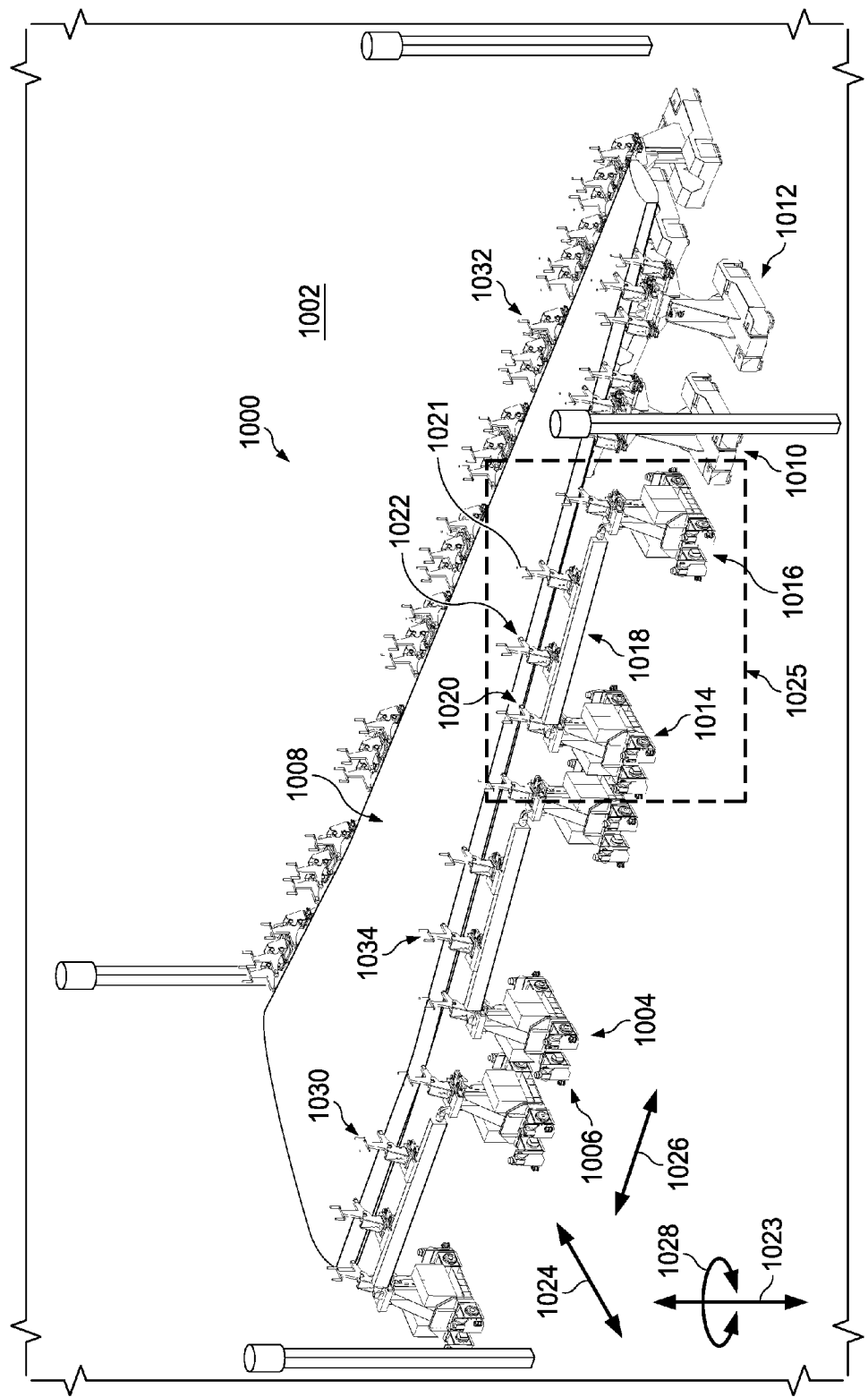
FIG. 10 is an illustration of an isometric view of a manufacturing environment in accordance with an illustrative embodiment.

With reference now to FIG. 10, an illustration of an isometric view of a manufacturing environment is depicted in accordance with an illustrative embodiment. In this illustrative example, manufacturing environment 1000 may be an example of one implementation for manufacturing environment 100 in FIG. 1. Manufacturing environment 1000 may be, for example, without limitation, the inside of a factory or some other type of manufacturing building.

As depicted, manufacturing environment 1000 has work surface 1002. Work surface 1002 may be, for example, without limitation, a substantially smooth floor. In this illustrative example, drivable support system 1004 may be moved into manufacturing environment 1000 and out onto work surface 1002. Drivable support system 1004 may be an example of one implementation for drivable support system 114 in FIG. 1.

Drivable support system 1004 may include plurality of supports 1006, which may be an example of one implementation for plurality of supports 113 in FIG. 1. In this illustrative example, each of plurality of supports 1006 may be implemented as an autonomous guided vehicle. In other words, each of plurality of supports 1006 may be capable of autonomously driving from any location on work surface 1002 to any other location on work surface 1002. In particular, each of plurality of supports 1006 may be moved or driven in an omnidirectional manner with respect to work surface 1002. In this manner, plurality of supports 1006 may be an example of one implementation for plurality of drivable supports 117 in FIG. 1.

In this illustrative example, plurality of supports 1006 may be used to support and hold wing assembly 1008. Wing assembly 1008 may be an example of one implementation for wing assembly 124 in FIG. 1. Examples of supports in plurality of supports 1006 may include support 1010 and support 1012. Support 1010 and support 1012 may be mobile supports. In particular, support 1010 and support 1012 may be drivable supports. Each of support 1010 and support 1012 may be implemented in a manner similar to support 800 in FIG. 8 above.

Further, plurality of supports 1006 may include, for example, without limitation, support 1014 and support 1016, which may be implemented in a manner similar to first support 600 and second support 602, respectively, in FIG. 6. In this illustrative example, beam 1018 may be associated with support 1014 and support 1016. Beam 1018 may be implemented in a manner similar to beam 201 in FIG. 2.

As depicted, set of connection devices 1020 may be associated with beam 1018. In particular, each of set of connection devices 1020 may be positioned along beam 1018 such that the connection device may be configured to connect to a particular location on wing assembly 1008. Each of set of connection devices 1020 may be implemented in a manner similar to the implementation of connection device 202 shown in FIGS. 2-5.

In this illustrative example, drivable support system 1004 may be used to provide plurality of control points 1022 along wing assembly 1008. Each of plurality of control points 1022 may be capable of being moved in three-dimensional space. Each control point in plurality of control points 1022 may be moved in at least one of a direction substantially parallel to z-axis 1023, a direction substantially parallel to x-axis 1024, a direction substantially parallel to y-axis 1026, or a direction of arrow 1028 about z-axis 1023.

In these illustrative examples, control point 1021 may be used to transition between a global coordinate system provided by z-axis 1023, x-axis 1024, and y-axis 1026 for manufacturing environment 1000 and a wing coordinate system for the wing being formed or an aircraft coordinate system for the aircraft for which the wing is being formed.

In this manner, control point 1021 may be used to locate the assembly onto the aircraft coordinate system.

For example, without limitation, control point 1021 may be a known location on wing assembly 1008. Identifying the location of control point 1021 in the global coordinate system for manufacturing environment 1000 by z-axis 1023, x-axis 1024, and y-axis 1026 may allow control point 1021 to be known with respect to the wing coordinate system or the aircraft coordinate system.

Metrology system 1030 may also be present. Metrology system 1030 may include plurality of transmitters 1032 and plurality of target systems 1034. Plurality of transmitters 1032 may be associated with work surface 1002 and used to create a global coordinate system for manufacturing environment 1000. Plurality of target systems 1034 may be associated with each of the connection devices of drivable support system 1004.

Plurality of target systems 1034 may be used to generate metrology data that may then be used for precise positioning of wing assembly 1008. In particular, the metrology data may be used to control operation of the various movement systems of drivable support system 1004 to precisely control the location of each of plurality of control points 1022 with respect to the global coordinate system identified using plurality of transmitters 1032. An enlarged view of portion 1025 may be depicted in FIG. 11 below.

Figure 11:
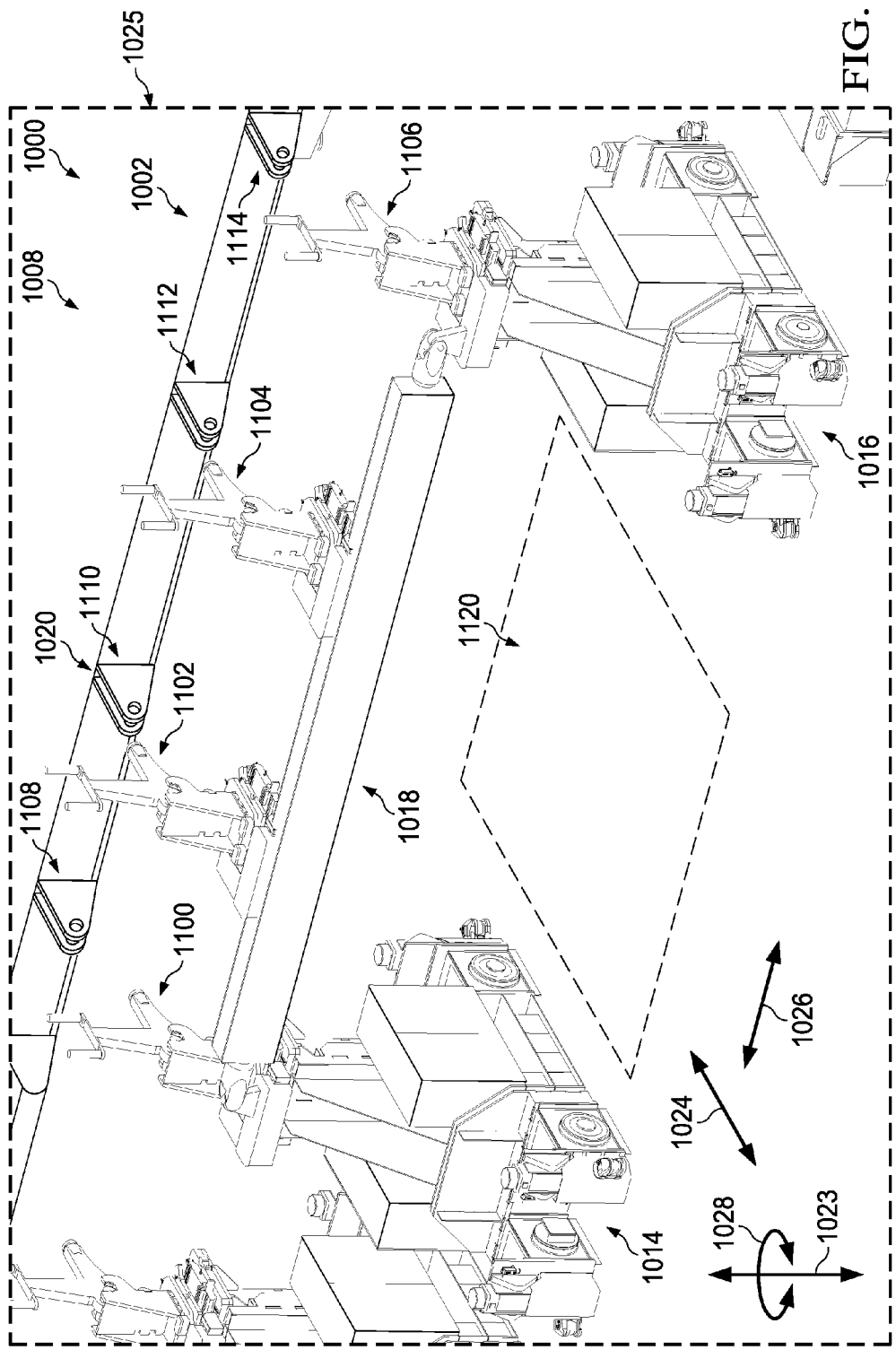
FIG. 11 is an illustration of an enlarged view of a portion of a manufacturing environment and a drivable support system in accordance with an illustrative embodiment.

With reference now to FIG. 11, an illustration of an enlarged view of portion 1025 of manufacturing environment 1000 and drivable support system 1004 from FIG. 10 is depicted in accordance with an illustrative embodiment. As depicted, connection device 1100 may be associated with support 1014. Set of connection devices 1020 may include connection device 1102 and connection device 1104 positioned along beam 1018. Connection device 1106 may be associated with support 1016.

Connection device 1100, connection device 1102, connection device 1104, and connection device 1106 may attach to wing assembly 1008 at control point 1108, control point 1110, control point 1112, and control point 1114, respectively. These connection devices may be configured to control the fine, precise positioning of these control points to control the locations of these control points. This positioning may be maintained prior to assembly and during assembly operations. Beam 1018 may distribute the loads applied to connection device 1100, connection device 1102, connection device 1104, and connection device 1106 by wing assembly 1008 along beam 1018 to support 1014 and support 1016.

Further, using beam 1018 allows support 1014 and support 1016 to be spread out such that open space 1120 may be created. Human operators, other mobile devices, autonomous tools, and other types of equipment may be allowed to pass through open space 1120 between support 1014 and support 1016. In this manner, the configuration of support 1014, support 1016, and beam 1018 may allow improved access to wing assembly 1008 and, in particular, to a bottom side of wing assembly 1008.

The illustrations of load-balancing structure 200, connection device 202, and connection device 204 in FIGS. 2, 6-7, connection device 202 in FIGS. 2-5, support 800 in FIGS. 8-9, and manufacturing environment 1000 in FIGS. 10-11 are not meant to imply physical or architectural limitations to the manner in which an illustrative embodiment may be implemented. Other components in addition to or in place of the ones illustrated may be used. Some components may be optional.

The different components shown in FIGS. 2-11 may be illustrative examples of how components shown in block form in FIG. 1 can be implemented as physical structures. Additionally, some of the components in FIGS. 2-11 may be combined with components in FIG. 1, used with components in FIG. 1, or a combination of the two.

Figure 12:
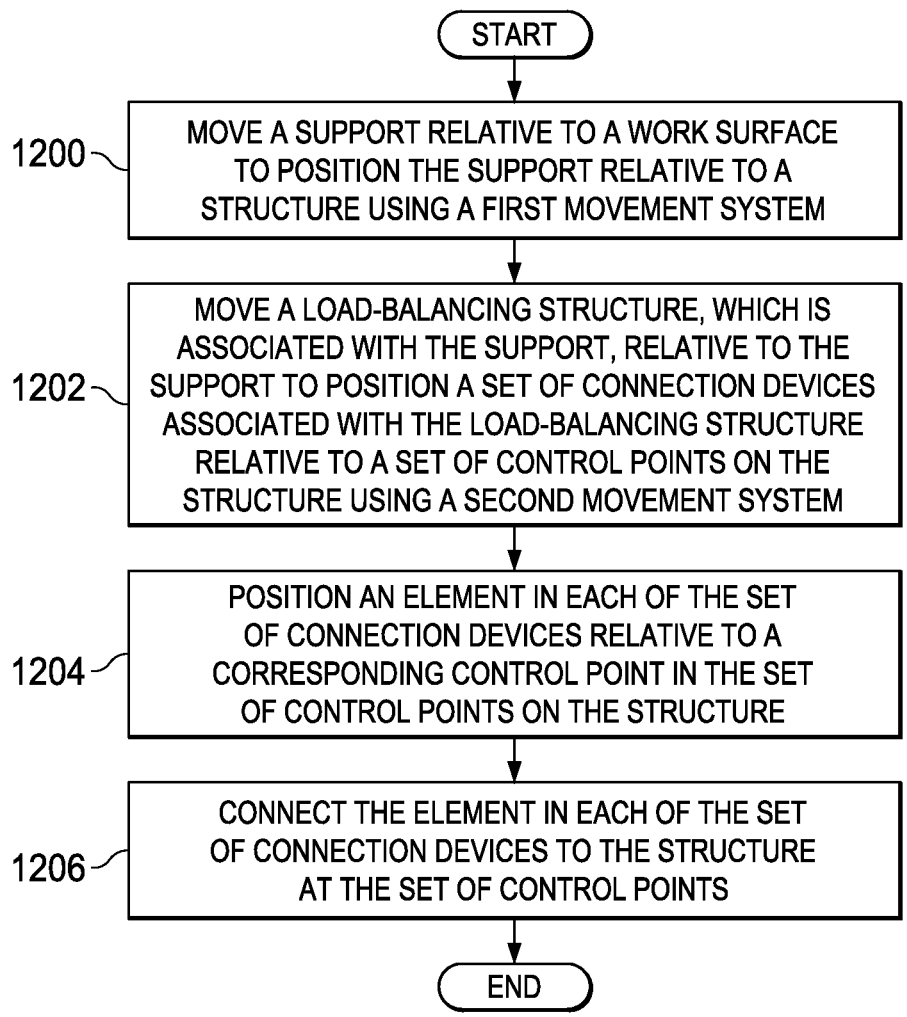
FIG. 12 is an illustration of a method for holding a structure in the form of a flowchart in accordance with an illustrative embodiment.

With reference now to FIG. 12, an illustration of a method for holding a structure is depicted in the form of a flowchart in accordance with an illustrative embodiment. The process illustrated in FIG. 12 may be implemented using for example, without limitation, support system 112 in FIG. 1.

The process may begin by moving support 128 relative to work surface 115 to position support 128 relative to structure 116 using a first movement system (operation 1200). The first movement system may be, for example, without limitation, drive system 131 in FIG. 1. Operation 1200 may be performed to roughly position support 128 relative to structure 116.

Next, load-balancing structure 138, which is associated with support 128, may be moved relative to support 128 to position set of connection devices 140 associated with load-balancing structure 138 relative to set of control points 142 on structure 116 using a second movement system (operation 1202). Operation 1202 may be performed using, for example, without limitation, movement system 160 in FIG. 1, to finely position set of connection devices 140 relative to structure 116. Set of control points 142 may be a set of connection points or a number of locations on structure 116 for connection.

Thereafter, an element in each of set of connection devices 140 may be positioned relative to a corresponding control point in set of control points 142 on structure 116 (operation 1204). In operation 1204, an element may be moved to position the element relative to location 151 to form a corresponding control point on structure 116 using a third movement system. As one illustrative example, the element may be element 146 in FIG. 1 and the third movement system may be movement system 148 in FIG. 1. Movement system 148 may provide precise positioning of element 146 relative to the corresponding control point 149.

In this manner, operation 1204 may be performed to precisely position the element of each of set of connection devices 140 which will be connected to structure 116 relative to the corresponding control point for connection with a desired level of accuracy. Then, the element in each of set of connection devices 140 may be connected to structure 116 at set of control points 142 (operation 1206), with the process terminating thereafter.

Figure 13:
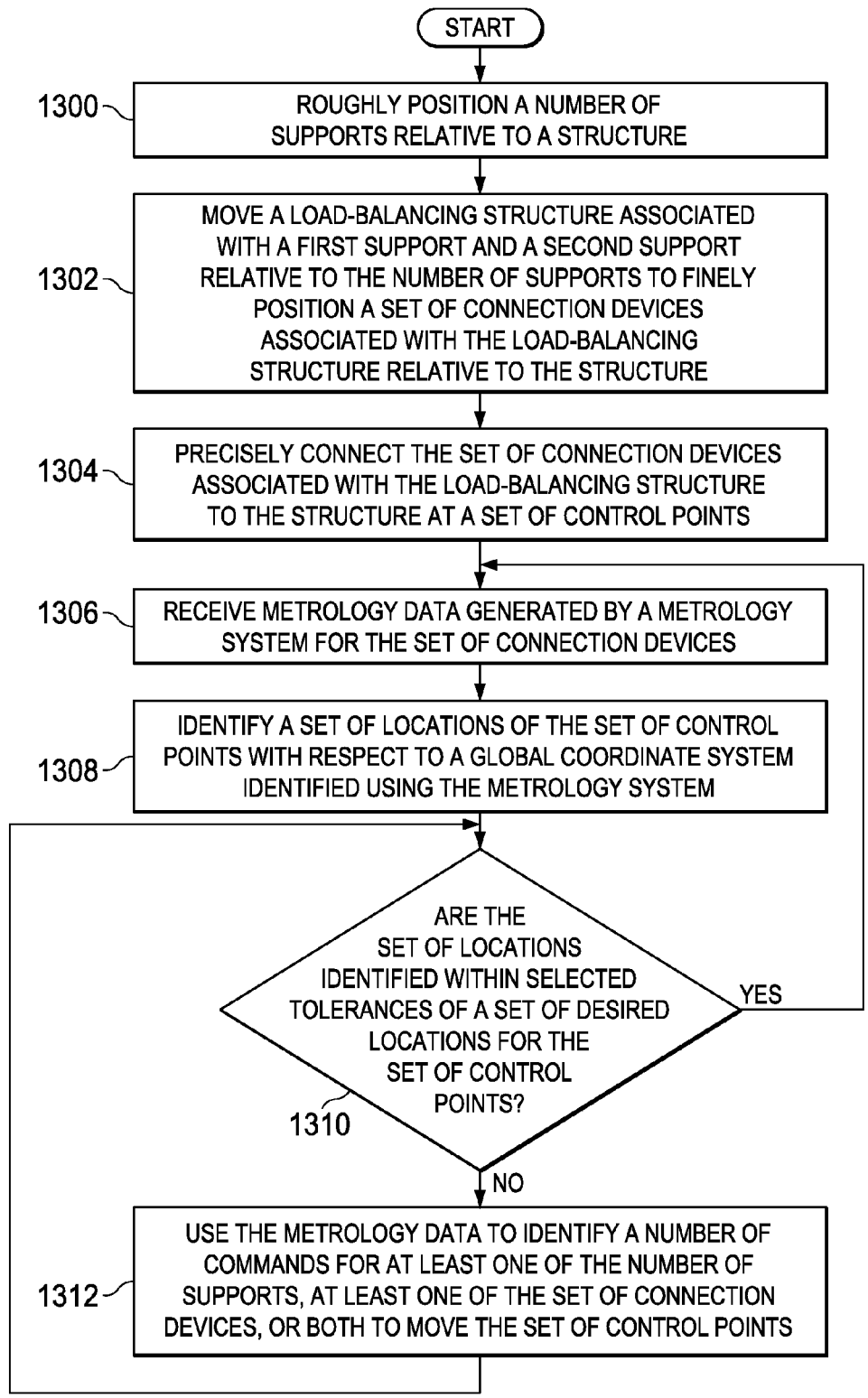
FIG. 13 is an illustration of a method for holding a structure during the assembly of a wing for an aircraft in the form of a flowchart in accordance with an illustrative embodiment.

With reference now to FIG. 13, an illustration of a method for holding a structure during the assembly of a wing for an aircraft is depicted in the form of a flowchart in accordance with an illustrative embodiment. The process illustrated in FIG. 13 may be implemented using drivable support system 114 in FIG. 1.

The process may begin by roughly positioning number of supports 111 relative to structure 116 (operation 1300). Number of supports 111 may include one support, such as support 128 or plurality of supports 113 in FIG. 1.

Next, load-balancing structure 138 associated with first support 150 and second support 152 may be moved relative to number of supports 111 to finely position set of connection devices 140 associated with load-balancing structure 138 relative to the structure 116 (operation 1302). Thereafter, set of connection devices 140 associated with load-balancing structure 138 may be precisely connected to structure 116 at set of control points 142 (operation 1304).

Metrology data 194 generated by metrology system 162 for set of connection devices 140 may be received (operation 1306). Metrology data 194 may be generated by a set of target systems associated with set of connection devices 140. Set of control points 142 may be at known locations on structure 116 such that set of control points 142 may be used to transition from global coordinate system 139 identified using metrology system 162 to reference coordinate system 157. Reference coordinate system 157 may take the form of a wing coordinate system, an aircraft coordinate system, or some other type of coordinate system, depending on the implementation.

A set of locations of set of control points 142 with respect to global coordinate system 139 identified using metrology system 162 may be identified (operation 1308). In particular, a location may be identified for each of set of control points 142, such as location 151 for control point 149, with respect to global coordinate system 139.

A determination may be made as to whether the set of locations identified are within selected tolerances of a set of desired locations for set of control points 142 (operation 1310). If the set of locations identified are within selected tolerances of a set of desired locations for set of control points 142, the process returns to operation 1306 as described above. Otherwise, metrology data 194 is used to identify a number of commands for at least one of number of supports 111, at least one of set of connection devices 140, or both to move set of control points 142 (operation 1312), with the process then returning to operation 1310 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in the form of a block diagram in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in the form of a block diagram in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1400 in FIG. 14. In particular, flexible manufacturing system 106 from FIG. 1 may be used to manufacture aircraft structures during any one of the stages of aircraft manufacturing and service method 1400. For example, without limitation, flexible manufacturing system 106 from FIG. 1 may be used to manufacture aircraft structures during at least one of component and subassembly manufacturing 1406, system integration 1408, routine maintenance and service 1414, or some other stage of aircraft manufacturing and service method 1400. For example, flexible manufacturing system 106 from FIG. 1 may be used to manufacture aircraft 1500 and or other components of aircraft 1500.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both. The use of a number of the different illustrative embodiments may substantially expedite the assembly of and reduce the cost of aircraft 1500.

The description of the different illustrative embodiments has been presented for purposes of illustration and description, and is not intended to be exhaustive or limited to the embodiments in the form disclosed. Many modifications and variations will be apparent to those of ordinary skill in the art.

For example, although the different illustrative embodiments have been described with respect to aircraft manufacturing, the illustrative embodiments may be applied to other types of manufacturing. For example, different illustrative embodiments may be applied to manufacturing structures such as wind turbine blades, ships, houses, automobiles, and other suitable types of structures. The different illustrative embodiments may be applied to any type of manufacturing in which reconfigurable support systems are desirable on a factory floor.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for supporting a structure, the method comprising:
    connecting a load-balancing structure to:
        a first support comprising first rails aligned vertically along a z-axis;
        a second support comprising second rails aligned vertically along the z-axis; and
        to a connecting device located between the first support and the second support;
    positioning, via using a first movement system, the first support and the second support relative to a work surface;
    moving, using a second movement system comprising the first rails and the second rails, the load-balancing structure and positioning the load-balancing structure relative to the structure via moving a connecting device connected to the first rails and connected to the load-balancing structure;
    moving, using a third movement system, an element associated with the connecting device and the load-balancing structure and positioning the element relative to a location on the structure, the element being configured to move, relative to the load-balancing structure, in any of: an x axis, a y axis, and the z axis, and to rotate about the z axis, such that the z axis aligns substantially perpendicular to a plane formed by the work surface;
    supporting the structure via connecting a detachable fitting into the element and to a control point of the structure; and
    distributing loads along the load-balancing structure to the first support and to the second support.

2. The method of claim 1, further comprising:
    moving, using the first movement system, a base structure of the first support and positioning, with a first level of precision, the first support relative to the structure.

3. The method of claim 1, further comprising:
    moving, using the second movement system, the load-balancing structure relative to the first support, the second movement system being connected to at least one of: a number of supports, or the load-balancing structure, and positioning, with a second level of precision, a set of connection devices connected to the load-balancing structure relative to the structure.

4. The method of claim 3, further comprising:
    moving, using the third movement system, the element along the x-axis, the y-axis, and the z-axis.

5. The method of claim 3, further comprising:
    moving, using the third movement system, the element relative to the load-balancing structure and positioning, to a third level of precision, the control point; and
    the third level of precision being more precise than either of the second level of precision or a first level of precision.

6. The method of claim 3, further comprising, positioning the element using feedback control provided by metrology data received from a metrology system.

7. The method of claim 1 further comprising:
    moving a set of connection devices relative to the load-balancing structure.

8. The method of claim 1 further comprising:
    simultaneously steering the first support and the second support across a factory floor.

9. The method of claim 8, further comprising:
    providing steering direction for the first support and the second support.

10. The method of claim 9, further comprising receiving the steering direction from at least one of: a controller associated with the first support and the second support, or a system controller.

11. The method of claim 1, further comprising fabricating, using the structure, a portion of an aircraft.

12. A method for supporting a structure, the method comprising:
    a base comprising:
        a first movement system for moving the base about on a work surface; and
        a vertical support member comprising a vertical rail system aligned with a z-axis;
    associating a load-balancing structure with the support member;
    positioning, to a first level of precision, the base relative to the structure;
    positioning, to a second level of precision, a connection device associated with a center of the load-balancing structure, relative to the support via moving, using a second movement system comprising the vertical rail system, the load-balancing structure;
    connecting a fitting, configured to connect to an element of the connection device, to the connection device; and
    moving the element of the connection device relative to the load-balancing structure to position, to a third level of precision, the element at a location on the structure, via moving, using a third movement system, the element of the connection device relative to the load-balancing structure, the third level of precision being more precise than either the first level of precision or the second level of precision, and the element being configured to move, relative to the load-balancing structure, in any of: an x-axis, a y-axis, and the z-axis, and to rotate about the z-axis, such that the z-axis aligns substantially perpendicular to a plane formed by the work surface.

13. The method of claim 12, further comprising:
    the first movement system comprising an autonomous guided drive system; and
    forming a control point via connecting the element to the structure at the location.

14. The method of claim 13, further comprising:
    positioning the control point via moving at least one of: the element of the connection device relative to the load-balancing structure, the connection device relative to the load-balancing structure, the load-balancing structure relative to the support, or the support relative to the work surface.

15. The method of claim 14, further comprising, positioning the control point using metrology data received from a metrology system.

* * * * *